(12) United States Patent
Kim

(10) Patent No.: US 9,310,984 B2
(45) Date of Patent: Apr. 12, 2016

(54) METHOD OF CONTROLLING THREE DIMENSIONAL OBJECT AND MOBILE TERMINAL USING THE SAME

(75) Inventor: Jong-Hwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 935 days.

(21) Appl. No.: 12/568,289

(22) Filed: Sep. 28, 2009

(65) Prior Publication Data

US 2010/0115455 A1 May 6, 2010

(30) Foreign Application Priority Data

Nov. 5, 2008 (KR) .................... 10-2008-0109230

(51) Int. Cl.
| | |
|---|---|
| *G06F 3/048* | (2013.01) |
| *G06F 3/041* | (2006.01) |
| *G06F 3/0484* | (2013.01) |
| *G06F 3/0481* | (2013.01) |
| *G06F 3/0488* | (2013.01) |

(52) U.S. Cl.
CPC ........ *G06F 3/04845* (2013.01); *G06F 3/04815* (2013.01); *G06F 3/04883* (2013.01)

(58) Field of Classification Search
USPC ........................ 715/781, 852; 345/173, 419
See application file for complete search history.

(56) References Cited

U.S. PATENT DOCUMENTS

| 6,115,025 A * | 9/2000 | Buxton ................ G06F 1/1601 345/166 |
|---|---|---|
| 6,798,429 B2 * | 9/2004 | Bradski ........................ 345/156 |
| 7,365,741 B2 * | 4/2008 | Chincholle et al. ........... 345/169 |
| 2003/0128205 A1 * | 7/2003 | Varghese ...................... 345/419 |
| 2003/0151592 A1 * | 8/2003 | Ritter ................. G01C 21/3638 345/156 |
| 2004/0233160 A1 * | 11/2004 | Chincholle et al. ........... 345/156 |
| 2005/0083314 A1 | 4/2005 | Shalit et al. |
| 2007/0124669 A1 * | 5/2007 | Makela ........................ 715/520 |
| 2008/0238916 A1 * | 10/2008 | Ghosh et al. .................. 345/419 |
| 2008/0268876 A1 * | 10/2008 | Gelfand ................. G06Q 30/02 455/457 |
| 2009/0082960 A1 * | 3/2009 | Ramaswamy et al. ........ 701/211 |
| 2009/0237411 A1 * | 9/2009 | Gossweiler et al. .......... 345/473 |
| 2009/0303231 A1 * | 12/2009 | Robinet et al. ................ 345/419 |
| 2010/0118025 A1 * | 5/2010 | Smith et al. ................... 345/418 |

FOREIGN PATENT DOCUMENTS

| JP | H-08-129473 A | 5/1996 |
|---|---|---|
| JP | H-09-62473 A | 3/1997 |
| KR | 10-2002-0084148 A | 11/2002 |
| KR | 10-2007-0023350 A | 2/2007 |
| WO | WO 01/69364 | 9/2001 |

OTHER PUBLICATIONS

European Search Report for Application No. 09174689.1 dated Jun. 23, 2010.
Korean Office Action issued in application No. 10-2008-0109230 dated Feb. 13, 2015.
Korean Office Action for Application 10-2008-0109230 dated Nov. 9, 2015.

* cited by examiner

*Primary Examiner* — Tadeese Hailu
*Assistant Examiner* — Darrin Hope
(74) *Attorney, Agent, or Firm* — KED & Associates LLP

(57) ABSTRACT

A method is provided of controlling a 3D individual object on a map by displaying a 3D map image including a plurality of 3D individual objects on a first display area, selecting at least one 3D individual object, obtaining detailed information of the selected 3D individual object from a memory and displaying the detailed information.

11 Claims, 45 Drawing Sheets

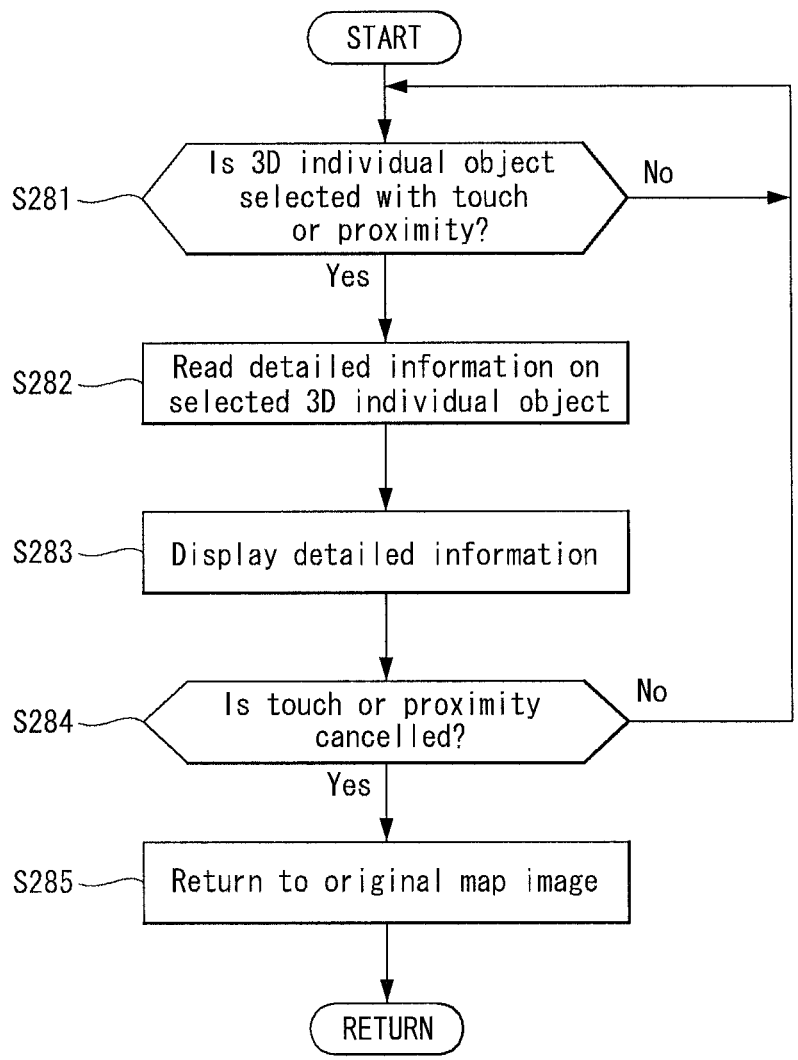

METHOD OF CONTROLLING THREE DIMENSIONAL OBJECT AND MOBILE TERMINAL USING THE SAME

This application claims priority from Korean Application No. 10-2008-0109230, filed Nov. 5, 2008, the subject matter of which is hereby incorporated by reference.

BACKGROUND

1. Field

Embodiments of the present invention may relate to controlling a three dimensional (3D) individual object on a 3D map image.

2. Background

A mobile terminal is a device that may perform various functions. Examples of such functions may include data and voice communications, capturing images and video via a camera, recording audio, playing music files via a speaker system, and displaying images and video on a display. Some terminals may include additional functionality that supports game playing, while other terminals may be configured as multimedia players. Mobile terminals may receive broadcast and multicast signals that permit viewing of content such as videos and television programs.

Terminals may be classified as a mobile terminal and a stationary terminal based on whether or not a terminal can be moved. Mobile terminals may be divided as a handheld terminal and a vehicle mount terminal based on whether or not a user can carry the mobile terminal.

Efforts are ongoing to support and increase functionality of mobile terminals. Such efforts may include software and hardware improvements as well as changes and improvements in structural components that form the mobile terminal.

As mobile terminals provide complicated and various functions, a user interface (UI) including a menu display and a list display may become complicated. Three dimensional user interfaces may display a complicated menu structure in a simple and colorful form using a three dimensional graphic image.

A function may be provided for displaying a three dimensional map image (hereafter called a 3D map image) on mobile terminals. However, the 3D map image may provide only simple 3D topography and geographical information to users.

BRIEF DESCRIPTION OF THE DRAWINGS

Arrangements and embodiments may be described in detail with reference to the following drawings in which like reference numerals refer to like elements and wherein:

FIG. 28 is a flowchart illustrating a method of controlling a 3D individual object according to a fourteenth example embodiment of the present invention;

DETAILED DESCRIPTION

Figure 1:
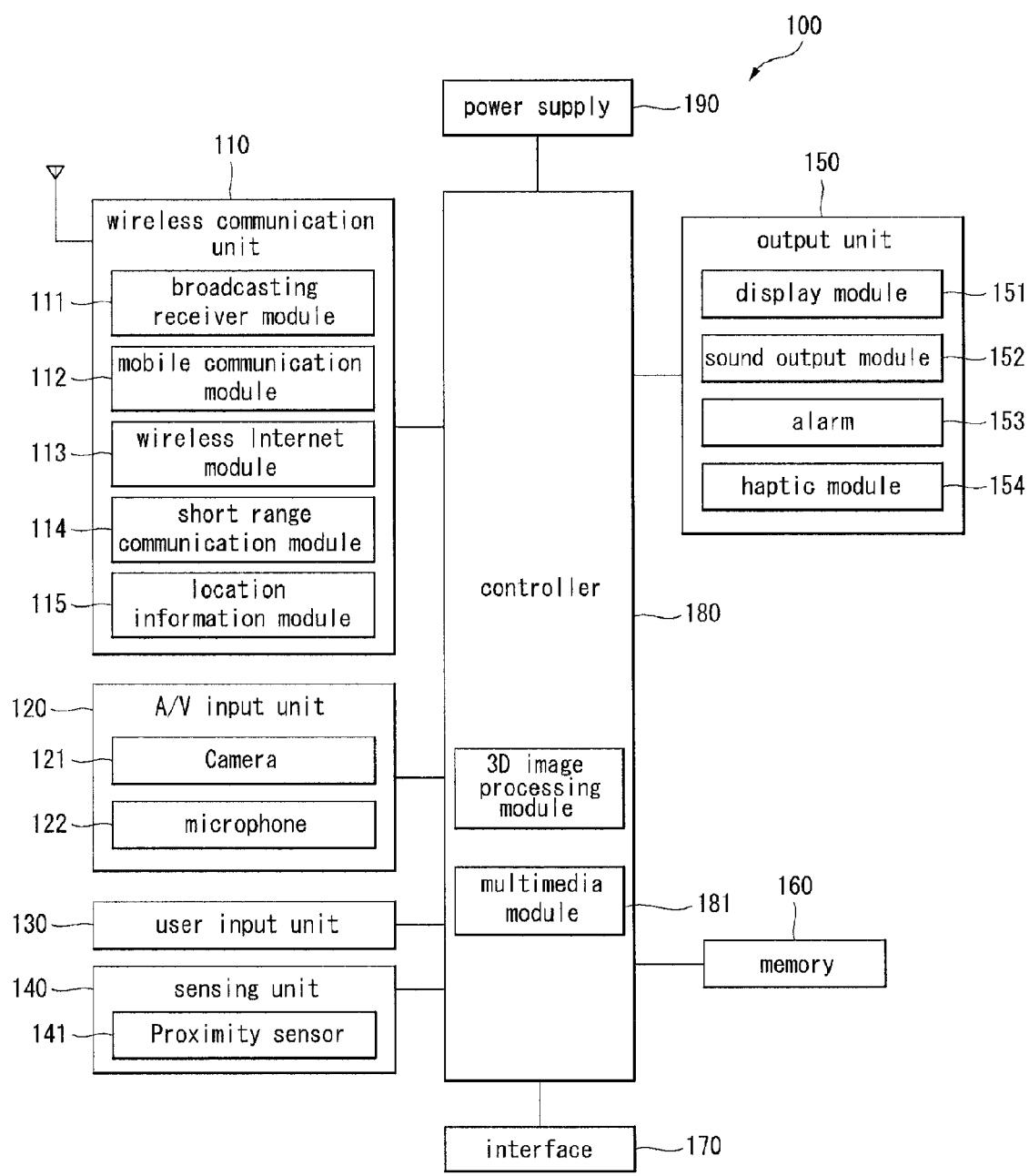
FIG. 1 is a block diagram of a mobile terminal in accordance with an example embodiment.

FIG. 1 is a block diagram of a mobile terminal in accordance with an example embodiment. Other embodiments and configurations may also be provided. The mobile terminal may be implemented using a variety of different types of terminals. Examples of such terminals include mobile phones, user equipment, smart phones, computers, digital broadcast terminals, personal digital assistants, portable multimedia players (PMP) and navigators. The following description may be provided with regard to a mobile terminal. However, such teachings apply equally to other types of terminals.

As shown in FIG. 1, a mobile terminal 100 may include a wireless communication unit 110, an audio/video (A/V) input unit 120, a user input unit 130, a sensing unit 140, an output unit 150, a memory 160, an interface 170, a controller 180 and a power supply 190. FIG. 1 shows the mobile terminal 100 having various components, but implementing all the illustrated components is not a requirement. A greater number or a fewer number components may alternatively be implemented.

FIG. 1 shows the wireless communication unit 110 includes one or more components that permit wireless communication between the mobile terminal 100 and a wireless communication system or a network within which the mobile terminal is located. For example, the wireless communication unit 110 may include a broadcast receiving module 111, a mobile communication module 112, a wireless Internet module 113, a short-range communication module 114 and a location information module 115 (or position-location module).

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information. Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be implemented as a TV broadcast signal, a radio broadcast signal, and/or a data broadcast signal, for example. The broadcast signal may further include a broadcast signal combined with a TV or radio broadcast signal.

The broadcast receiving module 111 may receive broadcast signals transmitted from various types of broadcast systems. Such broadcasting systems may include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). The receiving of multicast signals may also be provided.

Data received by the broadcast receiving module 111 may be stored in a suitable device, such as the memory 160. The mobile terminal 100 may receive 3D map data and 3D individual object information through the broadcast receiving module 111 connected to a broadcast receiving channel and store the 3D map data and 3D individual object information in the memory 160.

The mobile communication module 112 may transmit/receive wireless signals to/from one or more network entities (e.g., base station, Node-B). Such signals may represent audio signals, video signals, text/multimedia messages, 3D map data, 3D individual object information, etc.

The wireless Internet module 113 may support Internet access for the mobile terminal 100. The wireless Internet module 113 may be internally or externally coupled to the mobile terminal 100. The wireless Internet module 113 may use wireless LAN (WLAN) (Wi-Fi), wireless broadband (Wibro), world interoperability for microwave access (Wimax) and/or high speed downlink packet access (HSDPA) as wireless Internet technology.

The short-range communication module 114 may facilitate relatively short-range communications. Suitable technologies for implementing the short-range communication module 114 may include radio frequency identification (RFID), infrared data association (IrDA), ultra-wideband (UWB), as well as networking technologies commonly referred to as Bluetooth and ZigBee, for example. The mobile terminal 100 may receive 3D map data and 3D individual object information through the short-range communication module 114 connected to a short-range communication channel and store the 3D map data and the 3D individual object information in the memory 160.

The location information module 115 may identify or otherwise obtain a location or position of the mobile terminal 100. The location information module 115 may be implemented using a global positioning system (GPS) module that cooperates with associated satellites, network components, and/or combinations thereof. The GPS module 115 may produce 3D location information according to latitude, longitude and/or altitude with respect to a certain point (i.e., an individual object) at a certain time by calculating distances between the point (i.e., the individual object) and at least three satellites and time when distances are measured. A method of calculating location and time information by using three satellites and correcting an error in the location and time information by using another satellite may also be provided. The GPS module 115 may continuously calculate current location in real time and calculate velocity information by using the current location.

The audio/video (A/V) input unit 120 may provide an audio or video signal input to the mobile terminal 100. The A/V input unit 120 may include a camera 121 and a microphone 122. The camera 121 may receive and process image frames of still pictures or video. The processed image frames may be displayed on a display module 151.

The image frames processed by the camera 121 may be stored in the memory 160 or may be transmitted to an external device through the wireless communication unit 110. Two or more cameras 121 may be provided in the mobile terminal 100.

The microphone 122 may receive an external audio signal while the mobile terminal 100 is in a particular mode, such as a phone call mode, a recording mode and/or a voice recognition mode. The audio signal may be processed and converted into digital data. The mobile terminal 100 and in particular the A/V input unit 120 may include assorted noise removing algorithms (or noise canceling algorithms) to remove or reduce noise generated in the course of receiving the external audio signal. Data generated by the A/V input unit 120 may be stored in memory 160, utilized by output unit 150, and/or transmitted via one or more modules of the wireless communication unit 110. If desired, two or more microphones 122 and/or cameras 121 may be provided.

The user input unit 130 may generate input data responsive to user manipulation of an associated input device or devices. Examples of such devices include a keypad, a dome switch, a touchpad (e.g., static pressure/capacitance), a jog wheel and/or a jog switch. The user input unit 130 may be configured as a touchpad in cooperation with a touch screen display. Sensors of the sensing unit 140 may function as input units capable of receiving a user's instruction for selecting and controlling a 3D individual object.

The sensing unit 140 may provide status measurements of various aspects of the mobile terminal 100. For example, the sensing unit 140 may detect an open/close status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, and/or orientation or acceleration/deceleration of the mobile terminal 100. As one example, the mobile terminal 100 may be configured as a slide-type mobile terminal. In this configuration, the sensing unit 140 may sense whether a sliding portion of the mobile terminal 100 is open or closed. The sensing unit 140 may also sense the presence or absence of power provided by the power supply 190, the presence or absence of a coupling or other connection between the interface 170 and an external device.

The sensing unit 140 may include a touch screen having a touch sensor included in the display module 151 or mounted on the display module 151 and a proximity sensor 141 to sense a presence or absence of an object within a recognizable close distance and to sense motion or gesture of the object on the display module 151 or the touch screen. Further, the sensing unit 140 may include a gyro sensor and/or a terrestrial magnetic sensor that sense a motion variation, an orientation variation and/or an angle variation of the mobile terminal 100. A 3D individual object may be selected and controlled based on a user's touch sensed by the touch sensor, a proximity of the user sensed by the proximity sensor 141 and/or angle and motion variations of the mobile terminal 100 sensed by the gyro sensor.

The output unit 150 may include various components that support the output requirements of the mobile terminal 100. The output unit 150 may include the display module 151, an audio output unit 152, an alarm 153 and a haptic module 154.

The display module 151 may be implemented to visually display information associated with the mobile terminal 100. For example, the display module 151 may display a user interface, 2D and 3D graphic user interfaces, 2D and 3D map images and 3D individual object information under control of the controller 180. If the mobile terminal 100 is operating in a phone call mode, the display module 151 may provide a user interface or a graphical user interface that includes information associated with placing, conducting and/or terminating a phone call. As another example, if the mobile terminal 100 is in a video call mode or a photographing mode, the display module 151 may additionally or alternatively display images that are associated with these modes.

The display module 151 may be configured as a touch screen working in cooperation with an input device, such as a touchpad. This configuration may permit the display module 151 to function both as an output device and an input device.

The display module 151 may be implemented using known display technologies including, for example, a liquid crystal display (LCD), a thin film transistor-liquid crystal display (TFT-LCD), an organic light-emitting diode display (OLED), a flexible display and/or a three-dimensional display.

The mobile terminal 100 may include one or more displays. A two-display embodiment may have a first display configured as an internal display (viewable when the mobile terminal is in an opened position) and a second display configured as an external display (viewable in both the open and closed positions). A touch screen may be implemented in such a manner that a touch sensor is mounted on or included in the display module 151.

The touch sensor may be implemented such that the touch sensor converts a variation in pressure applied to a specific point of the display module 151 or a variation in capacitance generated at a specific point of the display module 151 into an electric input signal. The touch sensor may be implemented such that the touch sensor senses not only a touched point and area but also a touch pressure. When a touch input is applied to the touch sensor, a signal (signals) corresponding to the touch input may be transmitted to a touch signal processing module (not shown) of the controller 180. The touch signal processing module may calculate coordinates of a touched point from the touch signal and transmit the coordinates to the controller 180 such that the controller 180 can recognize the touched point on the touch screen. If the touch sensor is implemented using an electrostatic touch sensor, the touch sensor may sense proximity of a pointer based on an electric field variation due to proximity of the pointer.

The proximity sensor 141 may be arranged in an inner region of the mobile terminal 100, surrounded by the touch screen, and/or near the touch screen. The proximity sensor 141 may sense an object approaching a predetermined sensing face and/or presence or absence of a closely located object by using electromagnetic force or infrared rays without having mechanical contact with the object. The proximity sensor 141 may have a longer life and greater utilization than a contact sensor. The proximity sensor 141 may be implemented using a transmission type photoelectric sensor, a direct reflection photoelectric sensor, a mirror reflection photoelectric sensor, a radio frequency oscillating proximity sensor, a capacitance type proximity sensor, a magnetic proximity sensor, an infrared proximity sensor, etc.

The proximity sensor 141 may sense a proximity touch and/or proximity touch patterns (e.g. a proximity touch distance, a proximity touch direction, a proximity touch velocity, a proximity touch time, a proximity touch point, a proximity touch moving status, etc.). Information corresponding to touched proximity touch operation and proximity touch pattern may be displayed on the touch screen.

FIG. 1 shows the output unit 150 having the audio output module 152 that supports audio output requirements of the mobile terminal 100. The audio output module 152 may be implemented using one or more speakers, buzzers, other audio producing devices, and/or combinations thereof. The audio output module 152 may function in various modes including a call-receiving mode, a call-placing mode, a recording mode, a voice recognition mode and/or a broadcast reception mode. During operation, the audio output module 152 may output audio relating to a particular function (e.g., a call received, a message received, and/or errors).

The output unit 150 may include the alarm 153 to signal or otherwise identify an occurrence of a particular event associated with the mobile terminal 100. The events may include a call received, a message received and/or a user input received. An example of output may include providing tactile sensations (e.g. a vibration) to a user. For example, the alarm 153 may vibrate in response to the mobile terminal 100 receiving a call or a message. As another example, a vibration may be provided by the alarm 153 in response to receiving user input at the mobile terminal 100, thus providing a tactile feedback mechanism. Various outputs provided by components of the output unit 150 may be separately performed, or such output may be performed using any combination of the components. The alarm 153 may generate different effective sounds respectively corresponding to 3D individual objects displayed on a 3D map image. The 3D individual objects may include buildings, roads and/or nature. An effective sound associated with a building may be different from an effective sound associated with a road or nature. Accordingly, a user may intuitively recognize a 3D individual object through an effective sound corresponding to the 3D individual object when selecting the 3D individual object on a 3D map image.

The haptic module 154 may generate various haptic effects that a user can feel. An example of such tactile effects is vibration. Intensity and pattern of a vibration generated by the haptic module 154 may be controllable. For example, different vibrations may be combined and output and/or sequentially output. The haptic module 154 may generate a variety of haptic effects including an effect of stimulus according to arrangement of pins vertically moving for a contact skin face, an effect of stimulus according to a jet force or a sucking force of air through a jet hole or a sucking hole, an effect of stimulus rubbing the skin, an effect of stimulus according to contact of an electrode, an effect of stimulus using electrostatic force and/or an effect according to reproduction of cold and warmth using an element capable of absorbing or radiating heat in addition to vibrations. The haptic module 154 may not only transmit haptic effects through direct contact but may also allow the user to feel haptic effects through a kinesthetic sense of fingers or arms.

The haptic module 154 may generate different haptic patterns respectively corresponding to 3D individual objects displayed on a 3D map image. A user may intuitively recognize a 3D individual object through a haptic pattern corresponding to the 3D individual object when selecting the 3D individual object on a 3D map image.

The memory 160 may store various types of data to support processing, control and/or storage requirements of the mobile terminal 100. Examples of such data may include program instructions for applications operating on the mobile terminal 100, contact data, phonebook data, messages, pictures, video, 3D map data, 3D individual object information, etc. The memory 160 may store data corresponding to effective sounds in various patterns and haptic patterns output when touch input and proximity input are applied to the mobile terminal 100. These effective sounds and haptic patterns may have different patterns based on the attributes of the 3D individual objects. The memory 160 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, and/or other similar memory or data storage device. The mobile terminal 100 may operate in association with a web storage that performs a storing function of the memory 160 on the Internet.

The interface 170 may couple the mobile terminal 100 with external devices. The interface 170 may receive data from the external devices or power and transmit the data or power to internal components of the mobile terminal 100 or transmit data of the mobile terminal 100 to the external devices. The interface 170 may include a wired/wireless headset port, an external charger port, a wired/wireless data port, a memory card port, a port for connecting a device having a user identification module, an audio I/O port, a video I/O port, an earphone port, etc. The interface 170 may serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle may be used as a signal for confirming whether the mobile terminal 100 is correctly set in the cradle.

An identification module may be a chip that stores information for authenticating authority to use the mobile terminal 100 and can include a user identify module (UIM), a subscriber identify module (SIM) and/or a universal subscriber identify module (USIM). A device (hereafter called an identification device) including the identification module may be manufactured in the form of a smart card. Accordingly, the identification device may be connected to the mobile terminal 100 through a port. The identification module may store telephone numbers, call information, charging information, etc.

The controller 180 may control overall operations of the mobile terminal 100. For example, the controller 180 may perform control and processing associated with voice calls, data communications, video calls, camera operations and/or recording operations. The controller 180 may include a 3D image processing module and a multimedia module 181. The 3D image processing module may convert 3D data such as 3D map data, graphic data of 3D individual object information and 3D user interface data into 3D images and control angle and size of a 3D image displayed on the display module 151 in response to a direction change instruction according to user input or an angle variation of the mobile terminal 100. The multimedia module 181 may be configured as part of the controller 180, or the multimedia module 181 may be implemented as a separate component. The multimedia module 181 may process signals for playback of multimedia data. The controller 180 may perform pattern recognition to respectively recognize handwriting and picture-drawing input through the touch screen as characters and an image.

The power supply 190 may provide power required by the various components for the mobile terminal 100. The provided power may be internal power, external power, and/or combinations thereof.

Embodiments may be implemented in a computer-readable medium using, for example, computer software, hardware, and/or some combination thereof. For a hardware implementation, embodiments may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and/or a selective combination thereof. In some cases, embodiments may be implemented by the controller 180.

For a software implementation, embodiments may be implemented with separate software modules, such as procedures and functions, each of which may perform one or more of the functions and operations described herein. The software codes may be implemented with a software application written in any suitable programming language and may be stored in memory (e.g. the memory 160), and executed by a controller or processor (e.g. the controller 180).

The mobile terminal 100 may be implemented in a variety of different configurations. Examples of such configurations may include folder-type, slide-type, bar-type, rotational-type, swing-type and/or combinations thereof. For clarity, further disclosure may relate to a slide-type mobile terminal, although such teachings apply equally to other types of terminals.

Figure 2A:
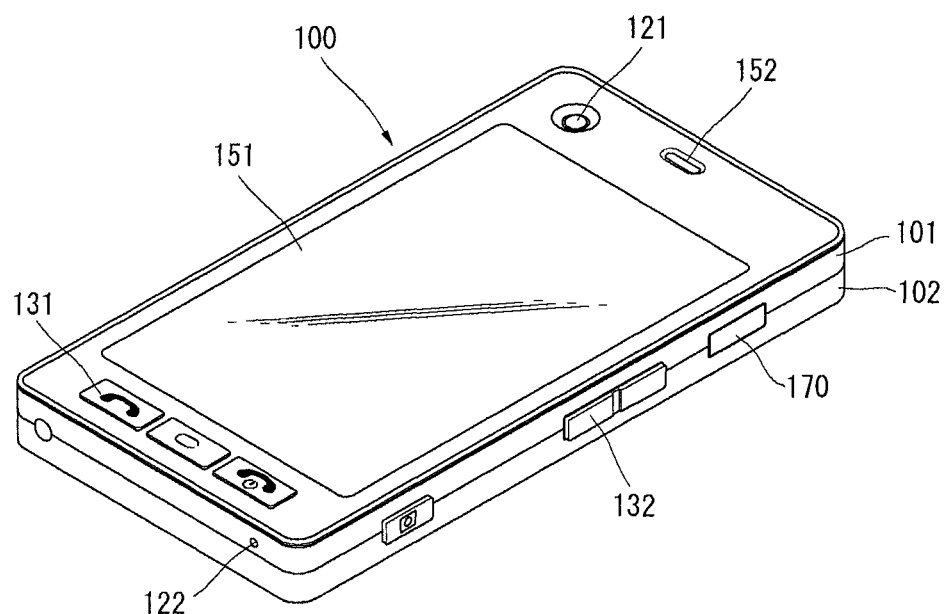
FIG. 2A is a perspective view of a front side of a mobile terminal according to an example embodiment.

FIG. 2A is a perspective view of a front side of a mobile terminal according to an example embodiment. The mobile terminal 100 may have a bar-shaped terminal body. The body of the mobile terminal 100 may include a case (e.g. a casing, a housing, a cover, etc.) forming an exterior of the mobile terminal 100. The case can be divided into a front case 101 and a rear case 102. Various electronic components may be arranged in the space formed between the front case 101 and the rear case 102. One or more intermediate cases may be provided between the front case 101 and the rear case 102.

The front and rear cases 101 and 102 may be formed from a suitably ridge material such as injection molded plastic, or may be formed using metallic material such as stainless steel (STS) and titanium (Ti).

The display module 151, the audio output unit 152, the camera 121, a plurality of operating units 131 and 132 of the user input unit 130, the microphone 122 and the interface 170 can be arranged in the front case 101.

The display unit 151 may occupy most part of the main face of the front case 101. The audio output unit 152 and the camera 121 may be arranged in a region in proximity to one of both ends of the display unit 151 and the first operating unit 131 and the microphone 122 may be located in a region proximity to the other end of the display unit 151. The second operating unit 132 and the interface 170 may be arranged on the sides of the front case 101 and the rear case 102.

The user input unit 130 may receive commands for controlling operation of the mobile terminal 100 and can include the plurality of operating units 131 and 132. The operating units 131 and 132 may employ any tactile manner in which a user operates the operating units 131 and 132 while having tactile feeling. For example, the operating units 131 and 132 may include a key pad, a dome switch, a touch pad, a jog wheel, a jog switch, a track ball, a joystick, etc.

The first and second operating units 131 and 132 can receive various inputs. For example, the first operating unit 131 may receive commands such as a start, an end and a scroll and the second operating unit 132 may receive commands such as control of the volume of sound output from the audio output unit 152 and conversion of the display unit 151 to a touch recognition mode. The operating units 131 and 132 may include an operating unit for displaying 3D map data and an operating unit for selecting and controlling a 3D individual object.

Figure 2B:
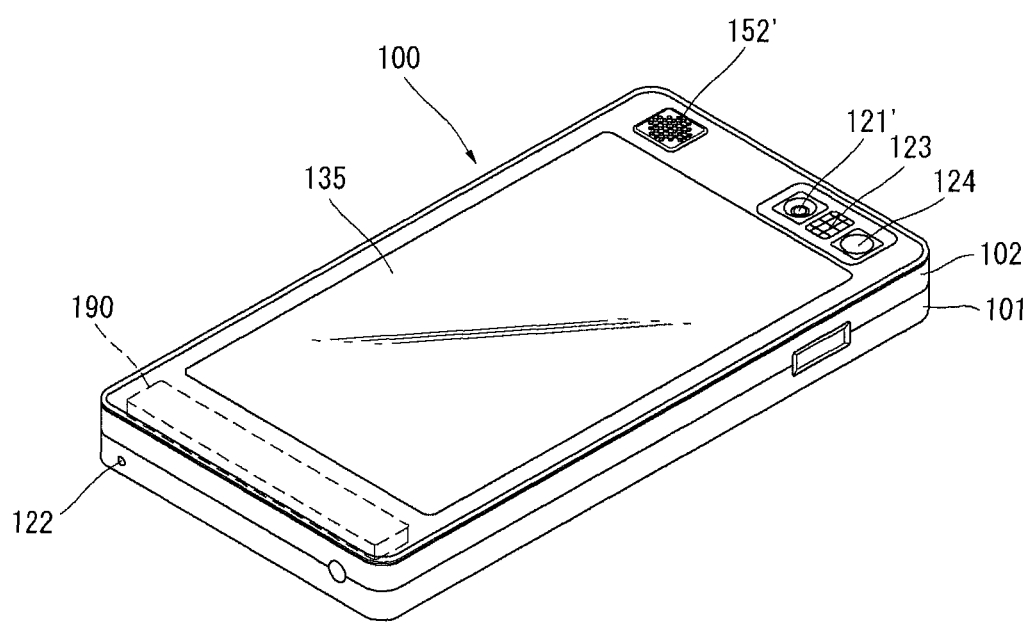
FIG. 2B is a rear view of the mobile terminal shown in FIG. 2.

FIG. 2B is a perspective view of a front side of a mobile terminal according to an example embodiment.

Referring to FIG. 2B, a camera 121' may be additionally provided to the rear case 102. The camera 121' may have a photographing direction opposite to that of the camera 121 and may have pixels different from those of the camera 121.

For example, the camera 121 may have low pixels such that the camera 121 may capture an image of a face of a user and transmit the image to a receiving part in case of a video call while the camera 121' has high pixels because the camera 121 captures an image of an object and does not immediately transmit the image in many cases. The cameras 121 and 121' may be attached to the terminal body such that they can be rotated or pop-up.

A flash 123 and a mirror 124 may be additionally provided in proximity to the camera 121'. The flash 123 may light an object when the camera 121' takes a picture of the object. The mirror 124 may be used for the user to look at his/her face in the mirror when the user wants to self-photograph himself/herself using the camera 121'.

The rear case 102 may also include the audio output module 152' configured as a speaker. The audio output modules 152 and 152' of the front and rear cases 101 and 102 may cooperate to provide a stereo output. Either or both of the audio output modules 152, 152' may be configured to operate as a speakerphone.

A broadcast signal receiving antenna 124 may be located on the side of the terminal body. The broadcast signal receiving antenna 124 may function in cooperation with the broadcast receiving module 111. The antenna 124 may be fixed or configured to retract into the body of the mobile terminal 100.

The power supply 190 for providing power to the mobile terminal 100 may be located in the terminal body. The power supply 190 may be included in the terminal body or may be detachably attached to the terminal body.

A touch pad 135 for sensing touch may be additionally provided to the rear case 102. The touch pad 135 may be of a light transmission type as the display module 151. If the display module 151 is implemented to output visual information through both sides thereof, the visual information may be recognized through the touch pad 135. The information output through both sides of the display module 151 may be controlled by the touch pad 135. A display may be additionally provided to the touch pad 135 such that a touch screen can be arranged even in the rear case 102.

The touch pad 135 may operate in association with the display module 151 of the front case 101. The touch pad 135 can be located in parallel with the display module 151 behind the display unit 151. The touch pad 135 may be identical to or smaller than the display unit 151.

Figure 3A:
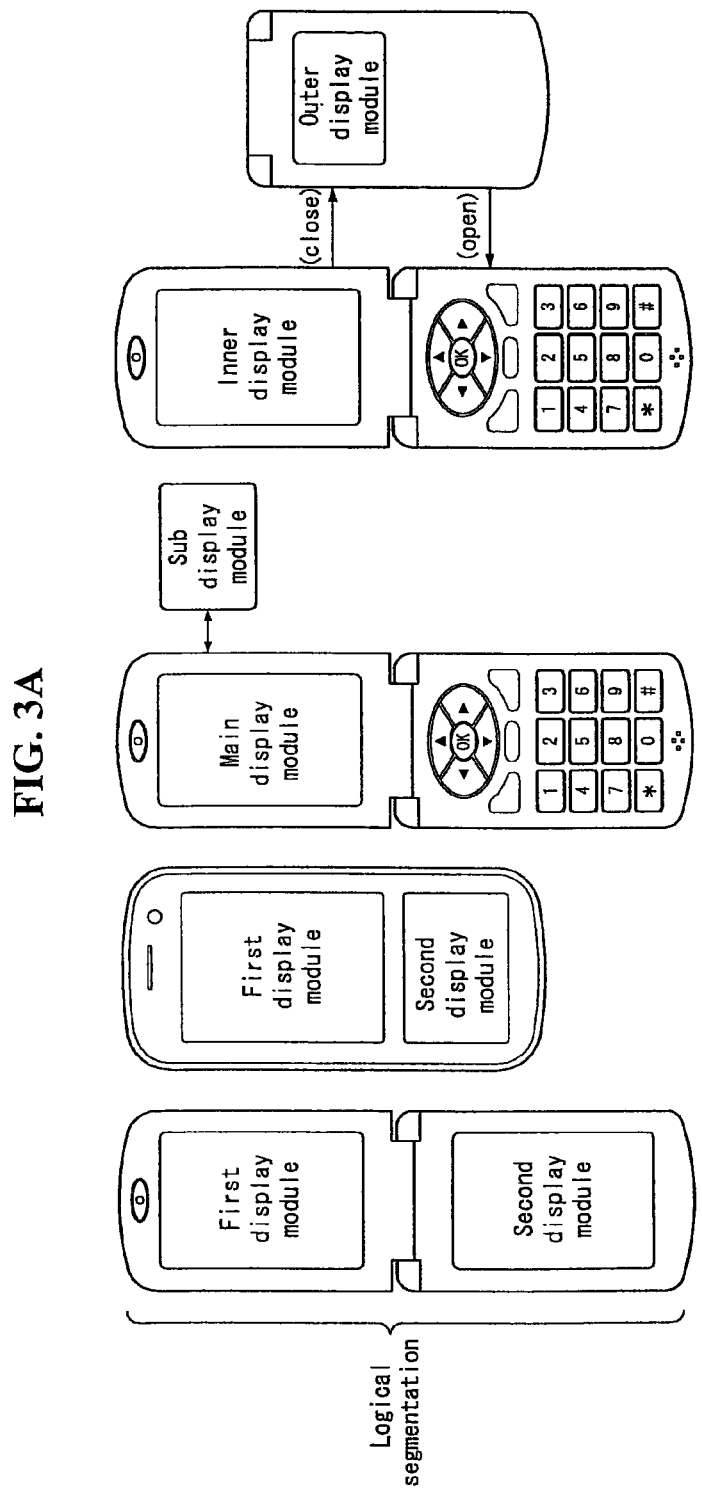
FIGS. 3A and 3B illustrate display module forms of a mobile terminal according to various example embodiments.
Figure 3B:
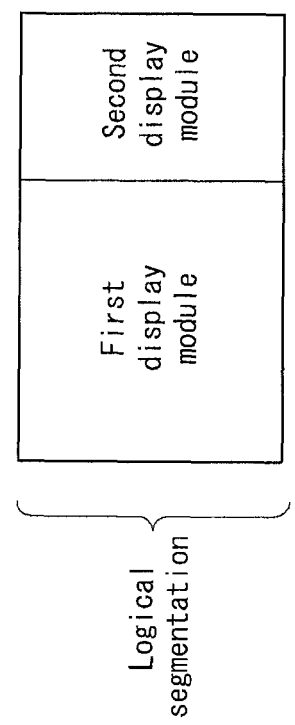

FIGS. 3A and 3B illustrate the mobile terminal 100 and the display module 151 according to various example embodiments.

The display module 151 may include a first display and a second display that are physically separated from each other, as shown in FIG. 3A. In a folder type or a slide type mobile terminal having two bodies connected through a hinge or a slide, the first display (or main display) can be formed on an inner face or an outer face of one of the bodies and the second display (or sub display or external display) may be formed on the inner face or the outer face of the other body. The sub display may be separated from the mobile terminal 100 and may be detachably combined with the mobile terminal body through an interface to display data from the mobile terminal 100.

The display module 151 may include first and second displays that are logically separated from each other in a display panel, as shown in FIG. 3B.

When the mobile terminal 100 displays 3D map image data, the whole 3D map image may be displayed on the first display module (or the main display module or the internal display module) and detailed information on a 3D individual object selected by a user and controlled according to a 3D individual object control signal may be displayed on the second display module.

Figure 4:
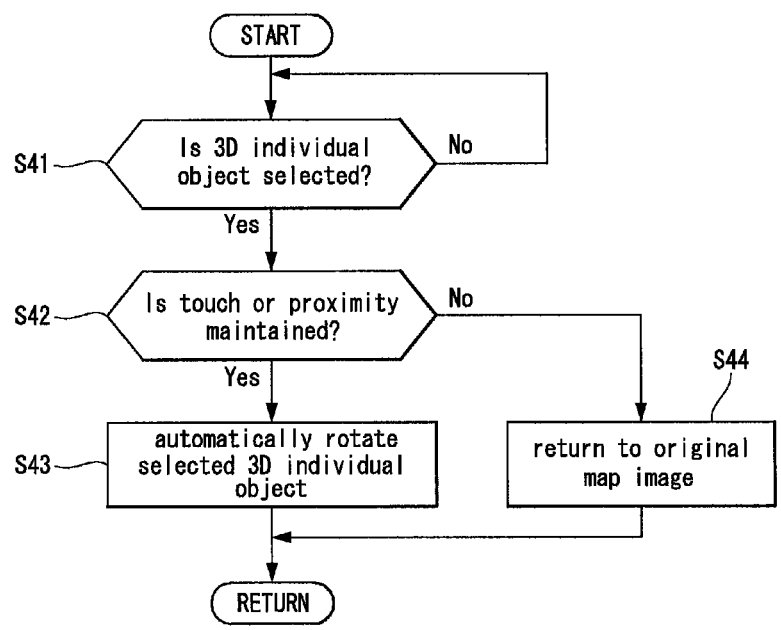
FIG. 4 is a flowchart illustrating a method of controlling a 3D individual object according to a first example embodiment of the present invention.
Figure 5A:
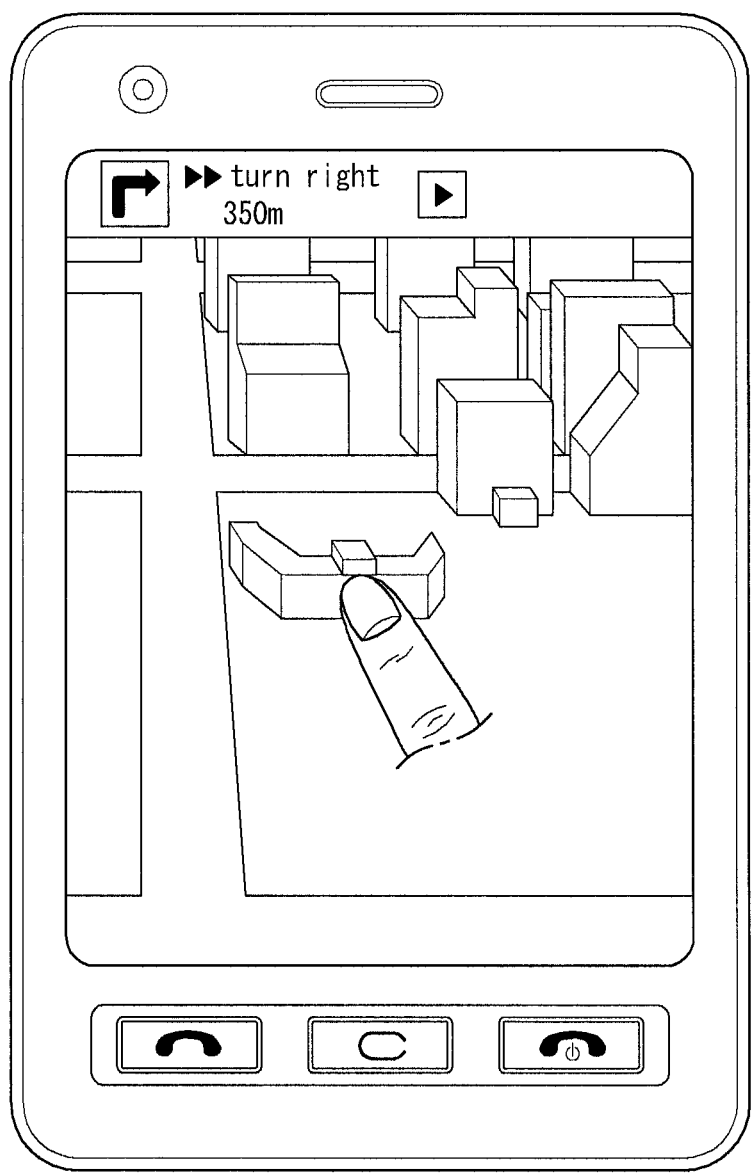
FIGS. 5A and 5B illustrate 3D map images according to the first example embodiment.
Figure 5B:
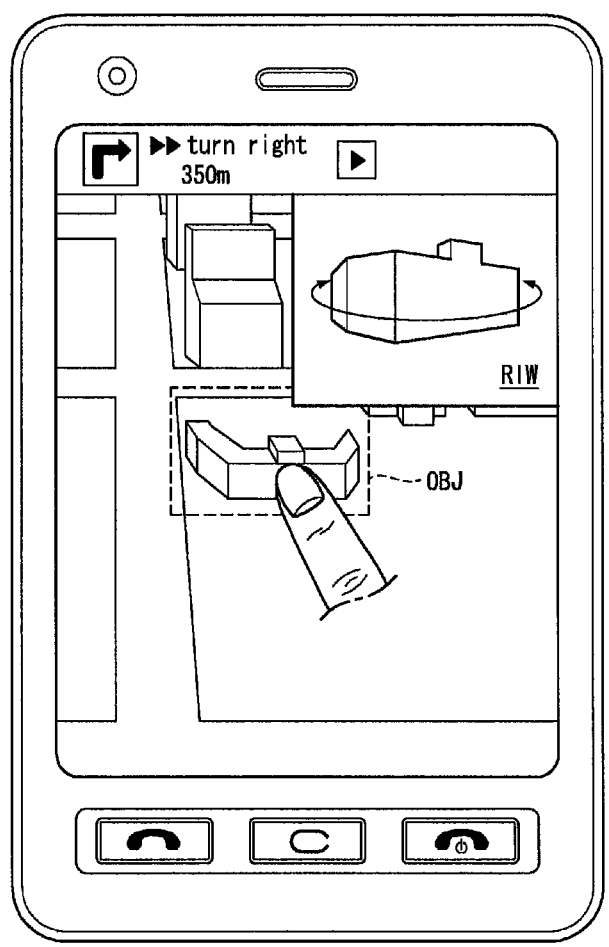
Figure 6:
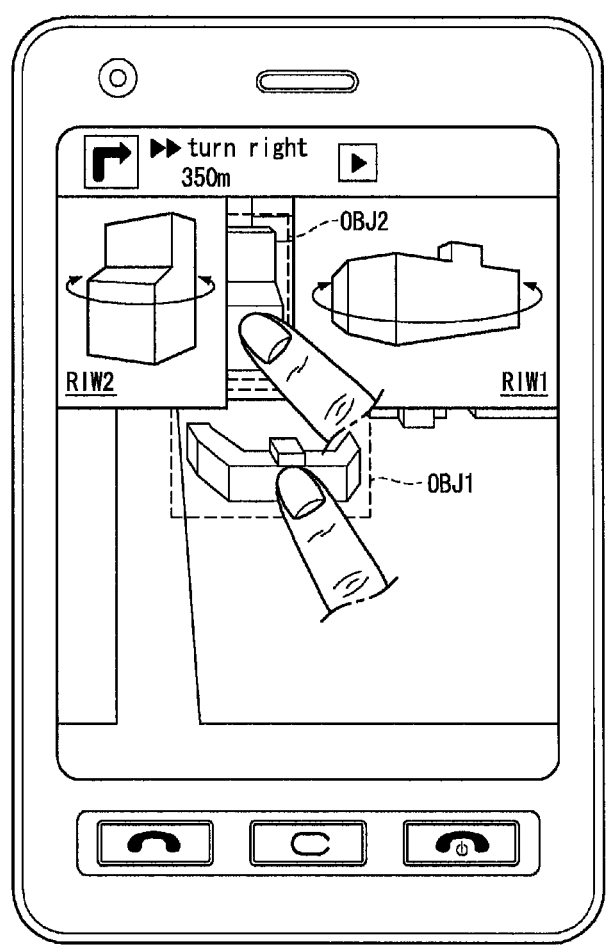
FIG. 6 illustrates a 3D map image showing an example of 3D individual objects selected according to a multi-touch input or a multi-proximity touch input.

FIG. 4 is a flowchart illustrating a method of controlling a 3D individual object on a 3D map image displayed on the mobile terminal 100 according to a first example embodiment of the present invention. FIGS. 5A, 5B and 6 illustrate 3D map images showing an example of a method of controlling a 3D individual object according to the first example embodiment. This method may be performed under control of the controller 180. Other embodiments, operations and orders of operation may also be within the scope of the present invention.

As used hereinafter, a first display area and/or a second display area may be described. The first/second display areas may also correspond to display window.

A 3D map image may be displayed on the touch screen of the mobile terminal 100, as shown in FIG. 5A. When a touch input or a proximity touch is applied to the 3D map image, a 3D individual object OBJ corresponding to a point to which the touch input or proximity input is applied may be automatically selected in operation S41. The 3D individual object OBJ may include a 3D image of an artificial structure or a natural object or a specific zone including such 3D image (3D images).

Different effective sounds or haptic patterns may be set for 3D individual objects on the 3D map image according to attributes of the 3D individual objects (e.g. a road, a building, a natural object, etc.). Accordingly, a user may recognize the selected 3D individual object through an effective sound or a haptic pattern set for the 3D individual object.

A first display area may display an outline between the selected 3D individual object OBJ and an unselected image surrounding the selected 3D individual object. The first display area may reduce a luminance of the unselected image and increase a luminance of the selected 3D individual object OBJ in order to easily recognize the 3D individual object OBJ when the 3D individual object OBJ is selected under control of the controller 180. The selected 3D individual object may be zoomed in and displayed on a second display area RIW, as shown in FIG. 5B.

While the touch input is maintained on the selected 3D individual object OBJ or a proximity input is maintained at a recognizable distance from the selected 3D individual object OBJ, the 3D individual object OBJ displayed in the second display area RIW may automatically rotate in a predetermined direction in operations S42 and S43. Accordingly, the user may see a graphic image (i.e., detailed 3D individual object information) of the 3D individual object OBJ that can not be viewed from the 3D map image by maintaining the touch input or the proximity input. For example, the selected 3D individual object may be displayed as an image viewed from a direction and/or orientation different from the view point direction and/or orientation of the 3D map image on the second display area RIW, and thus a rear and sides of the 3D individual object OBJ that are not displayed on the 3D map image may be sequentially displayed in the second display area RIW.

When the touch input or the proximity input is cancelled, the original 3D map image may be displayed in operations S42 and S44. The 3D individual object OBJ displayed on the second display area RIW may disappear. If the first and second display areas are logically separated from each other in a single display panel, the second display area RIW may display a part of the 3D map image that was displayed prior to the selected 3D individual object OBJ.

The user may select multiple 3D individual objects OBJ1 and OBJ2 through multiple touch inputs or multiple proximity inputs in operation S41, as shown in FIG. 6. The selected 3D individual objects OBJ1 and OBJ2 may be respectively displayed on two different second display areas RIW1 and RIW2 or may be displayed together on a single second display area. The selected 3D individual objects OBJ1 and OBJ2 may rotate about their centers or about a center point between the selected 3D individual objects OBJ1 and OBJ2. In this example, only the 3D individual object OBJ (or the 3D individual objects OBJ1 and OBJ2) for which the touch input or the proximity input (or touch inputs or proximity inputs) is maintained can rotate in operation S43.

In another embodiment, the 3D individual object OBJ may be selected according to a key input, a jog wheel input, a trackball input and/or a joystick input. A specific number or a pointer, such as an arrow, may designate the 3D individual object OBJ on the first display area. The user may can press a key corresponding to the number of the 3D individual object OBJ to select the 3D individual object OBJ. The 3D individual object OBJ displayed in the second display area RIW may automatically rotate while the key is pressed and the original 3D map image may be displayed when pressure applied to the key is removed. Further, the user may move the pointer through a jog wheel, a trackball and/or a joy stick to select the 3D individual object OBJ, rotate the selected 3D individual object OBJ to a desired direction and stop operation of the jog wheel, the trackball and/or the joy stick to display the original 3D map image.

Figure 7:
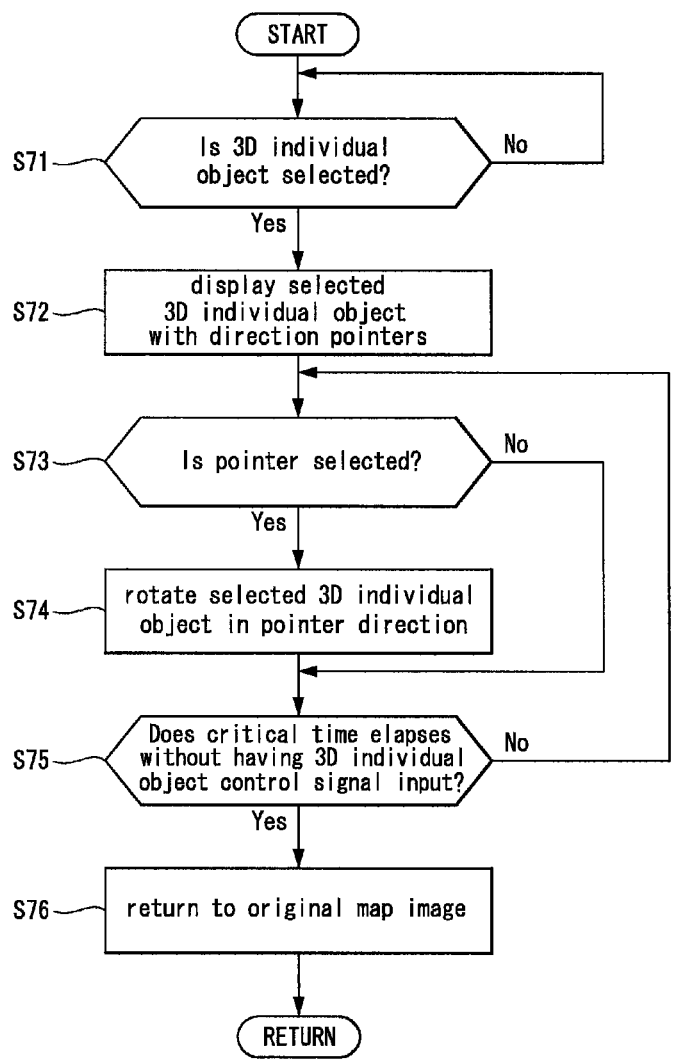
FIG. 7 is a flowchart illustrating a method of controlling a 3D individual object according to a second example embodiment of the present invention.
Figure 8:
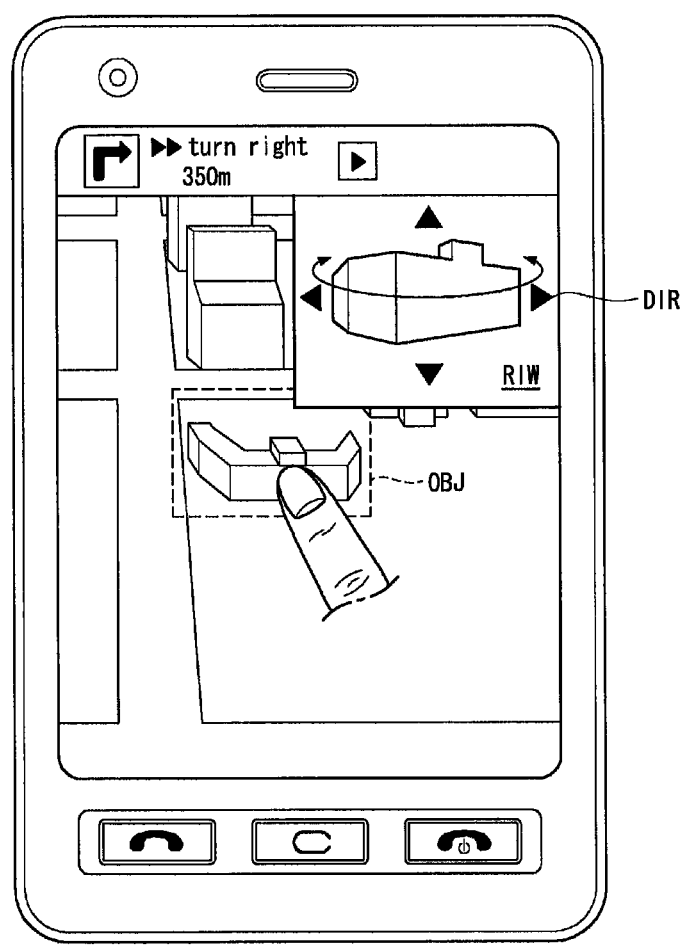
FIG. 8 illustrates a 3D map image according to the second example embodiment.

FIG. 7 is a flowchart illustrating a method of controlling a 3D individual object according to a second example embodiment of the present invention. FIG. 8 illustrates a 3D map image showing an example of a method of controlling a 3D individual object according to the second example embodiment. This method may be performed under control of the controller 180. Other embodiments, operations and orders of operation may also be within the scope of the present invention.

The 3D map image may be displayed on the touch screen of the mobile terminal 100, as shown in FIG. 5A. A user may select a 3D individual object OBJ through a touch input, a proximity input and/or other inputs in operation S71. The 3D individual object OBJ may be a specific object, such as a building or a natural object, or a zone that includes the specific object.

Different effective sounds or haptic patterns may be set for 3D individual objects on the 3D map image based on attributes of the 3D individual objects (e.g. a road, a building, a natural object, etc.). Accordingly, a user may recognize the selected 3D individual object through the effective sound or haptic pattern set for the 3D individual object. The first display area may display an outline between the selected 3D individual object OBJ and an unselected image surrounding the selected 3D individual object or reduce a luminance of the unselected image and increase a luminance of the selected 3D individual object OBJ in order to easily recognize the 3D individual object OBJ when the 3D individual object OBJ is selected under control of the controller 180.

As shown in FIG. 8, when the 3D individual object OBJ is selected in operation S71, the selected 3D individual object OBJ may be zoomed in and may be displayed together with direction pointers DIR in the second display area RIW in operation S72. While the direction pointers DIR correspond to a graphic icon including arrows respectively indicating four directions in FIG. 8, the direction pointers DIR may also include text such as "top, bottom, left and right" or "east, west, south and north" and/or a combination of the graphic icon and text.

When a 3D individual object control signal for selecting one of the direction pointers DIR according to a user input using a touch input, a proximity input and/or other inputs is generated, the 3D individual object OBJ may automatically rotate in the direction indicated by the selected direction pointer in operations S73 and S74. Accordingly, the user may see the graphic image (i.e., detailed 3D individual object information) of the 3D individual object OBJ that may not be viewed from the 3D map image by selecting the 3D individual object OBJ and a direction pointer and rotating the selected 3D individual object OBJ to a desired direction. For example, the selected 3D individual object may be displayed as an image viewed from a direction and an orientation different from the view point direction and orientation of the 3D map image on the second display area RIW. Thus, the rear, side, top and bottom of the 3D individual object OBJ that are not displayed on the 3D map image may be sequentially displayed in the second display area RIW.

When a predetermined critical time elapses without having the 3D individual object control signal (i.e., the user input), the original 3D map image may be displayed in operations S75 and S76. The 3D individual object OBJ displayed in the second display area RIW may disappear. If the first and second display areas are logically separated from each other in a single display panel, then the second display area RIW may display a part of the 3D map image that was displayed prior to the selected 3D individual object OBJ.

The user may select, in operation S71, multiple 3D individual objects OBJ1 and OBJ2 through multiple touch inputs or multiple proximity inputs, as shown in FIG. 6. The selected 3D individual objects OBJ1 and OBJ2 and direction pointers corresponding thereto may be respectively displayed on two different second display areas RIW1 and RIW2 or may be displayed together on a single second display area. The selected 3D individual objects OBJ1 and OBJ2 may rotate about their centers in directions indicated by selected direction pointers or around a center point between the selected 3D individual objects OBJ1 and OBJ2. Different direction pointers may be selected for the selected 3D individual objects OBJ1 and OBJ2. In this example, the 3D individual objects OBJ1 and OBJ2 may rotate in a same direction or may respectively rotate in different directions based on a user's selection.

The 3D individual object OBJ may be selected according to a key input, a jog wheel input, a trackball input and/or a joystick input in operation S71. In this example, a specific number or a pointer, such as an arrow, may designate the 3D individual object OBJ on the first display area. The user may press a key corresponding to a number of the 3D individual object OBJ to select the 3D individual object OBJ and operate a key designated as a direction key to select a rotating direction of the selected 3D individual object OBJ. Further, the user may move the pointer on the 3D map image through a jog wheel, a trackball and/or a joy stick to select the 3D individual object OBJ and a direction pointer on the selected 3D individual object OBJ to rotate the selected 3D individual object OBJ to a desired direction. When the predetermined critical time elapses without having the above described input, the original 3D map image may be displayed in operation S76.

Figure 9:
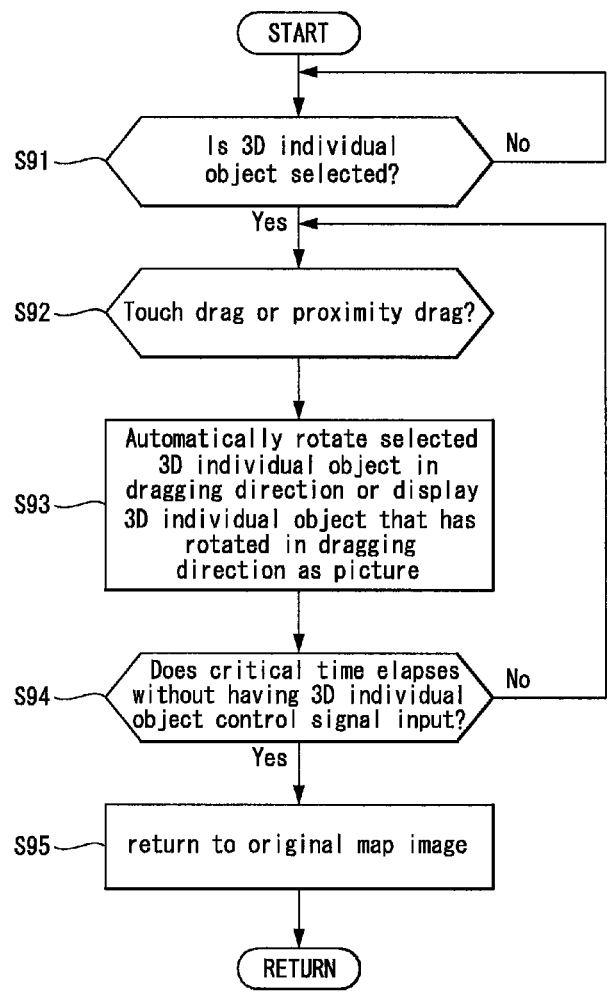
FIG. 9 is a flowchart illustrating a method of controlling a 3D individual object according to a third example embodiment of the present invention.
Figure 10A:
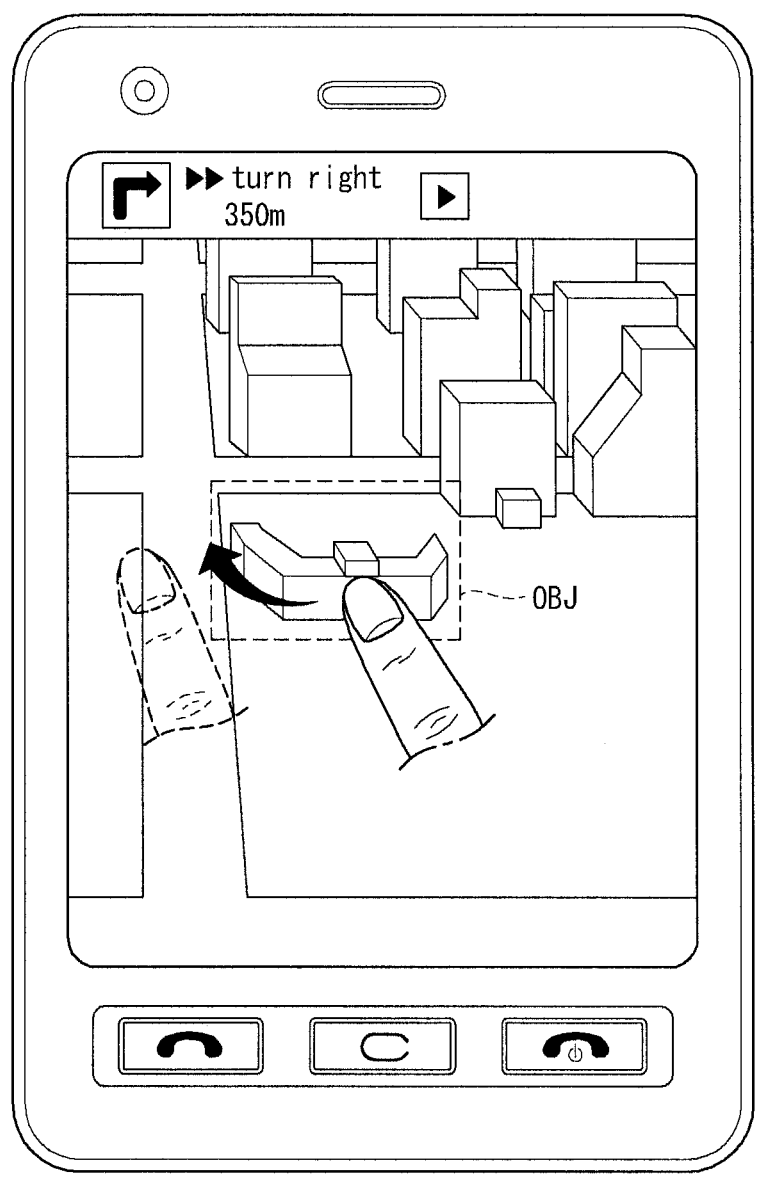
FIGS. 10A and 10B illustrate 3D map images according to the third example embodiment.
Figure 10B:
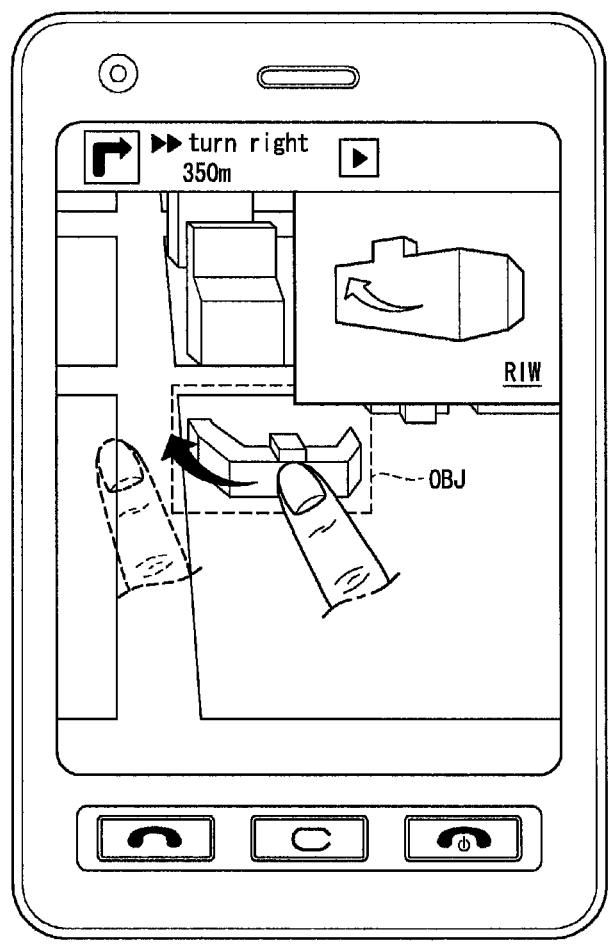

FIG. 9 is a flowchart illustrating a method of controlling a 3D individual object according to a third example embodiment of the present invention. FIGS. 10A and 10B illustrate 3D map images showing an example of a method of controlling a 3D individual object according to the third example embodiment. This method may be performed under control of the controller 180. Other embodiments, operations and orders of operation may also be within the scope of the present invention.

A 3D map image may be displayed on the touch screen of the mobile terminal 100, as shown in FIG. 10A. A user may select a 3D individual object OBJ on the 3D map image through a touch input or a proximity input and drag (or move or copy) the selected 3D individual object OBJ in a touch state or a proximity input state in operation S91. The 3D individual object OBJ may include a specific object, such as a building or a natural object, and/or a specific zone that includes the specific object.

Different effective sounds or haptic patterns may be set for 3D individual objects on the 3D map image based on attributes of the 3D individual objects (e.g. a road, a building, a natural object, etc.). Accordingly, the user may recognize the selected 3D individual object through the effective sound or haptic pattern set for the 3D individual object.

The first display area may display an outline between the selected 3D individual object OBJ and an unselected image surrounding the selected 3D individual object or reduce a luminance of the unselected image and increase a luminance of the selected 3D individual object OBJ in order to easily recognize the 3D individual object OBJ when the 3D individual object OBJ is selected under control of the controller 180.

When the 3D individual object OBJ is selected and dragged (or moved or copied), the selected 3D individual object may be zoomed in and may be displayed in the second display area RIW, as shown in FIG. 10B. The 3D individual object OBJ may automatically rotate in the dragging direction or may be displayed as a picture showing the 3D individual object OBJ that has rotated in the dragging direction in operations S92 and S93. Accordingly, the user may rotate the selected 3D individual object OBJ in a desired direction by making a gesture (or motion) of selecting and dragging the 3D individual object OBJ to view the graphic image (i.e., detailed 3D individual object information) of the 3D individual object OBJ that can not be viewed from the 3D map image. For example, the selected 3D individual object may be displayed as an image viewed from a direction and an orientation different from the view point direction and orientation of the 3D map image on the second display area RIW. Thus, the rear, side, top and bottom of the 3D individual object OBJ that are not displayed in the 3D map image may be sequentially displayed on the second display area RIW.

When a predetermined critical time elapses without having the 3D individual object control signal (i.e., the user input such as a touch or a proximity), the original 3D map image may be displayed in operations S94 and S95. The 3D individual object OBJ displayed in the second display area RIW may disappear. If the first and second display areas are logically separated from each other on a single display panel, the second display area RIW may display a part of the 3D map image that was displayed prior to the selected 3D individual object OBJ.

The user may select, in operation S91, multiple 3D individual objects OBJ1 and OBJ2 through multiple touch inputs or multiple proximity inputs, as shown in FIG. 6. The selected 3D individual objects OBJ1 and OBJ2 and direction pointers corresponding thereto may be respectively displayed in two different second display areas RIW1 and RIW2 or may be displayed together in a single second display area. The selected 3D individual objects OBJ1 and OBJ2 may respectively rotate about their centers in their dragging directions and speeds or may rotate about a center point between the selected 3D individual objects OBJ1 and OBJ2. In this example, the 3D individual objects OBJ1 and OBJ2 may rotate in a same dragging direction or respectively rotate in different dragging directions in operation S93.

The 3D individual object OBJ may be selected according to a key input, a jog wheel input, a trackball input and/or a joystick input in operation S91. In this example, a specific number or a pointer, such as an arrow, may designate the 3D individual object OBJ in the first display area. The user may press a key corresponding to a number of the 3D individual object OBJ to select the 3D individual object OBJ and select a rotating direction of the 3D individual object OBJ through touch dragging or proximity dragging. When the predetermined critical time elapses without having a 3D individual object control signal input to the mobile terminal 100, the original 3D map image may be displayed in operation S95.

Figure 11:
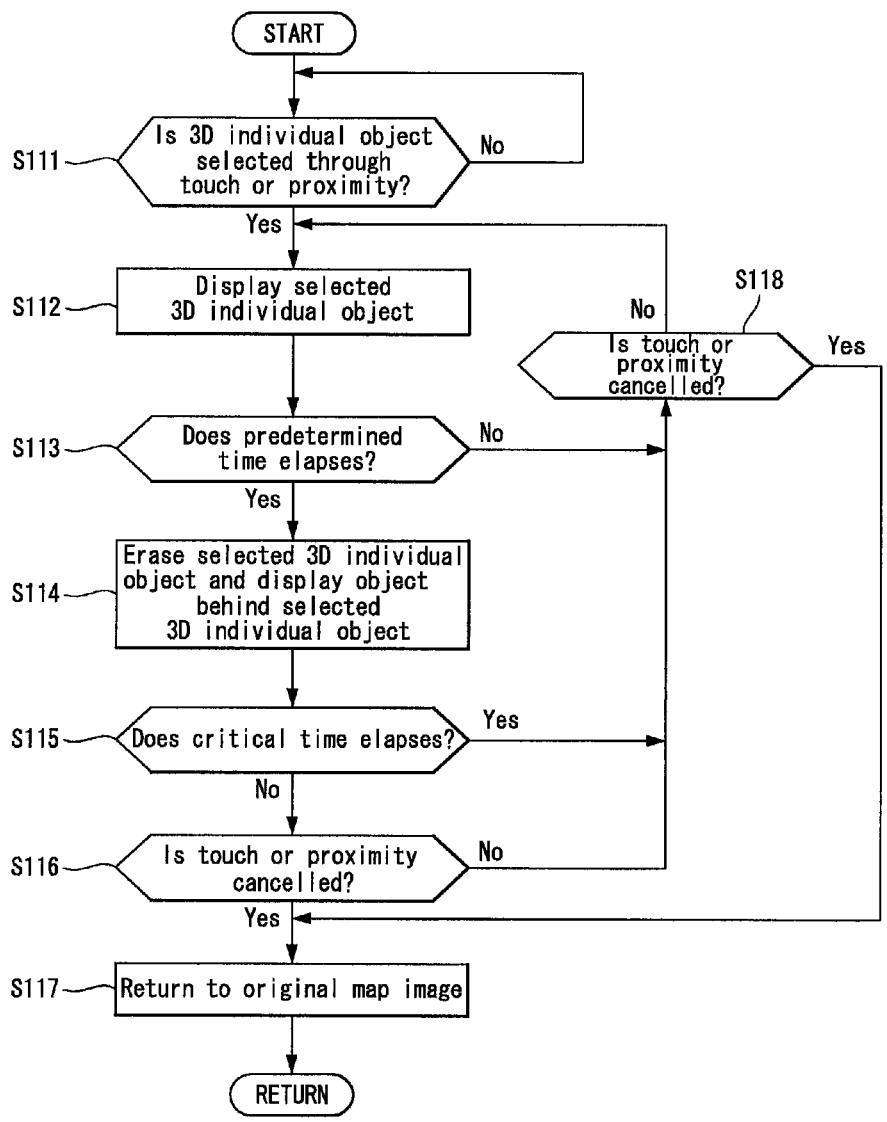
FIG. 11 is a flowchart illustrating a method of controlling a 3D individual object according to a fourth example embodiment.
Figure 12A:
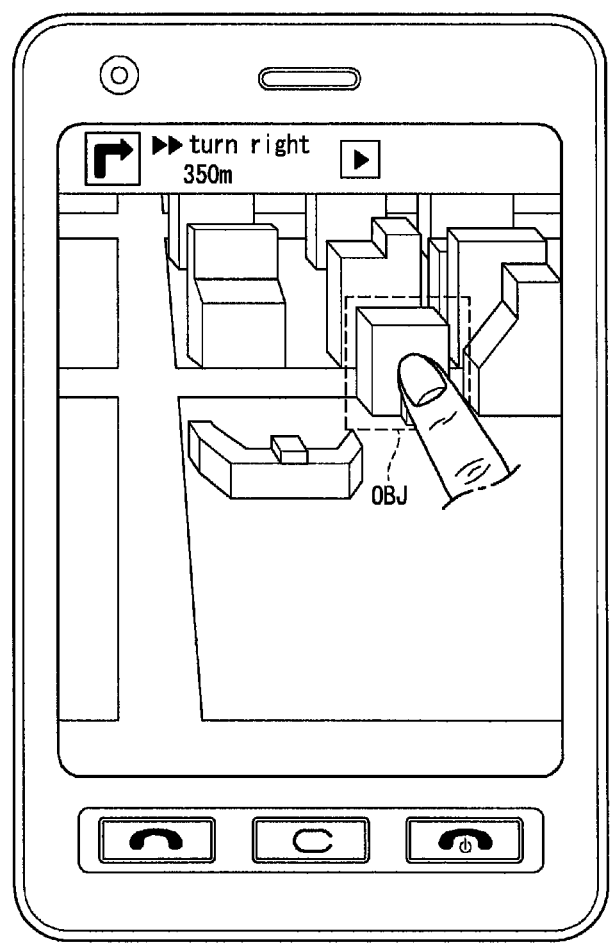
FIGS. 12A and 12B illustrate 3D map images according to the fourth example embodiment.
Figure 12B:
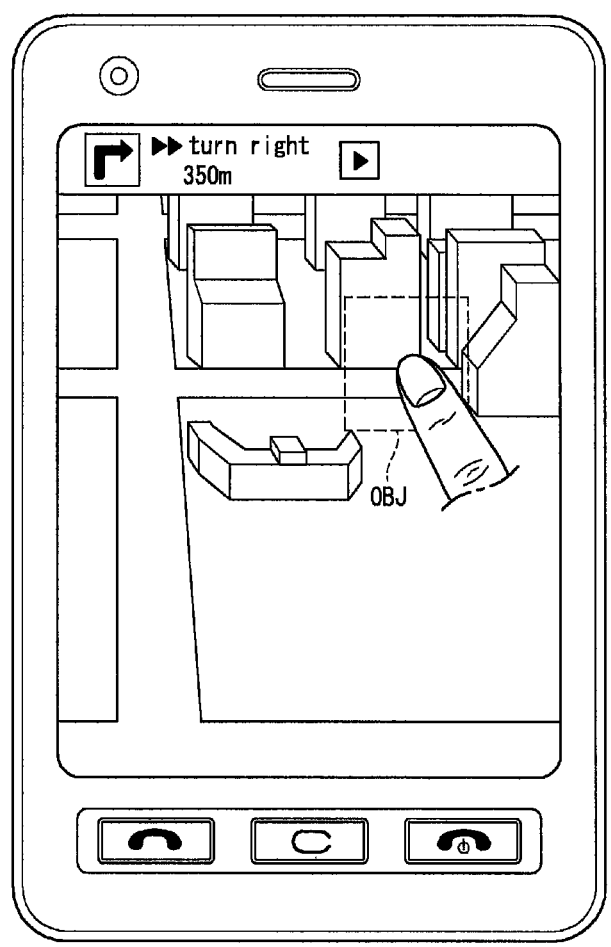

FIG. 11 is a flowchart illustrating a method of controlling a 3D individual object according to a fourth example embodiment of the present invention. FIGS. 12A and 12B illustrate 3D map images showing an example of a method of controlling a 3D individual object according to the fourth example embodiment. This method may be performed under control of the controller 180. Other embodiments, operations and orders of operation may also be within the scope of the present invention.

A 3D map image may be displayed on the touch screen of the mobile terminal 100, as shown in FIG. 12A. A user can select a 3D individual object OBJ on the 3D map image through a touch input or a proximity input in operation S111. Whenever a predetermined critical time elapses while the 3D individual object OBJ is being touched or proximity-touched, the selected 3D individual object OBJ and a 3D individual object behind the selected 3D individual object OBJ may be alternately displayed, as shown in FIGS. 12A and 12B in operations S112, S113, S114 and S115. The selected 3D individual object OBJ may disappear when the 3D individual object behind the selected 3D individual object OBJ is displayed.

The selected 3D individual object OBJ may include a specific object, such as a building or a natural object, and/or a specific zone that includes the specific object. Different effective sounds or haptic patterns may be set for 3D individual objects on the 3D map image based on attributes of the 3D individual objects (e.g. a road, a building, a natural object, etc.). Accordingly, the user can recognize the selected 3D individual object through the effective sound or haptic pattern set for the 3D individual object.

The first display area may display an outline between the selected 3D individual object OBJ and an unselected image surrounding the selected 3D individual object or reduce a luminance of the unselected image and increase a luminance of the selected 3D individual object OBJ in order to easily recognize the 3D individual object OBJ when the 3D individual object OBJ is selected under control of the controller 180. The user can alternately view the selected 3D individual object OBJ and the 3D individual object behind the selected 3D individual object OBJ by maintaining the touch input or the proximity input applied to the 3D individual object OBJ.

The selected 3D individual object OBJ and the 3D individual object behind the selected 3D individual object OBJ may be displayed in the 3D map image on the first display area or may be separated from the 3D map image, zoomed in and displayed on the second display area. In the latter case, the selected 3D individual object OBJ may be displayed in the 3D map image on the first display area without being erased and the 3D individual object behind the selected 3D individual object OBJ may be displayed as a rotating video or picture on the second display area.

When the 3D individual object control signal is not input (i.e., the touch input or the proximity input is cancelled), the original 3D map image may be displayed in operations S116, S117 and S118.

If the selected 3D individual object OBJ includes only a single building or natural object, operations S111 through S116 may be omitted.

The user can select, in operation S111, multiple 3D individual objects OBJ1 and OBJ2 through multiple touch inputs or multiple proximity inputs, as shown in FIG. 6. The selected 3D individual objects OBJ1 and OBJ2 and 3D individual objects behind the selected 3D individual objects OBJ1 and OBJ2 may be alternately displayed.

The 3D individual object OBJ may be selected according to a key input, a jog wheel input, a trackball input and/or a joystick input in operation S111. In this example, a specific number or a pointer, such as an arrow, may designate the 3D individual object OBJ on the first display area. The user can press a key corresponding to a number of the 3D individual object OBJ to select the 3D individual object OBJ and alternately view the selected 3D individual object OBJ and the 3D individual object behind the selected 3D individual object OBJ while the 3D individual object control signal is input. When the 3D individual object control signal is not input anymore, the original 3D map image may be displayed in operation S117.

Figure 13:
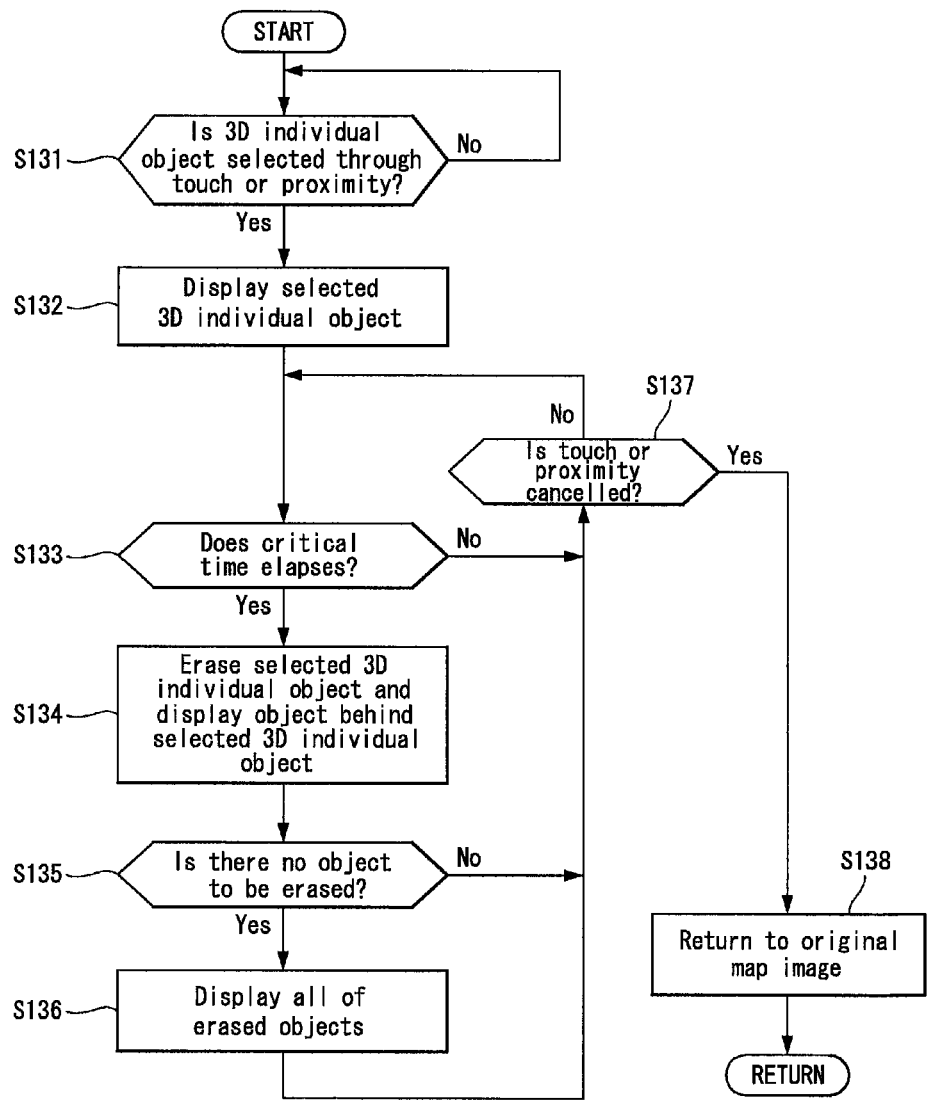
FIG. 13 is a flowchart illustrating a method of controlling a 3D individual object according to a fifth example embodiment.

FIG. 13 is a flowchart illustrating a method of controlling a 3D individual object according to a fifth example embodiment of the present invention. FIGS. 14A through 14E illustrate 3D map images showing an example of a method of controlling a 3D individual object according to the fifth example embodiment. This method may be performed under control of the controller 180. Other embodiments, operations and orders of operation may also be within the scope of the present invention.

Figure 14A:
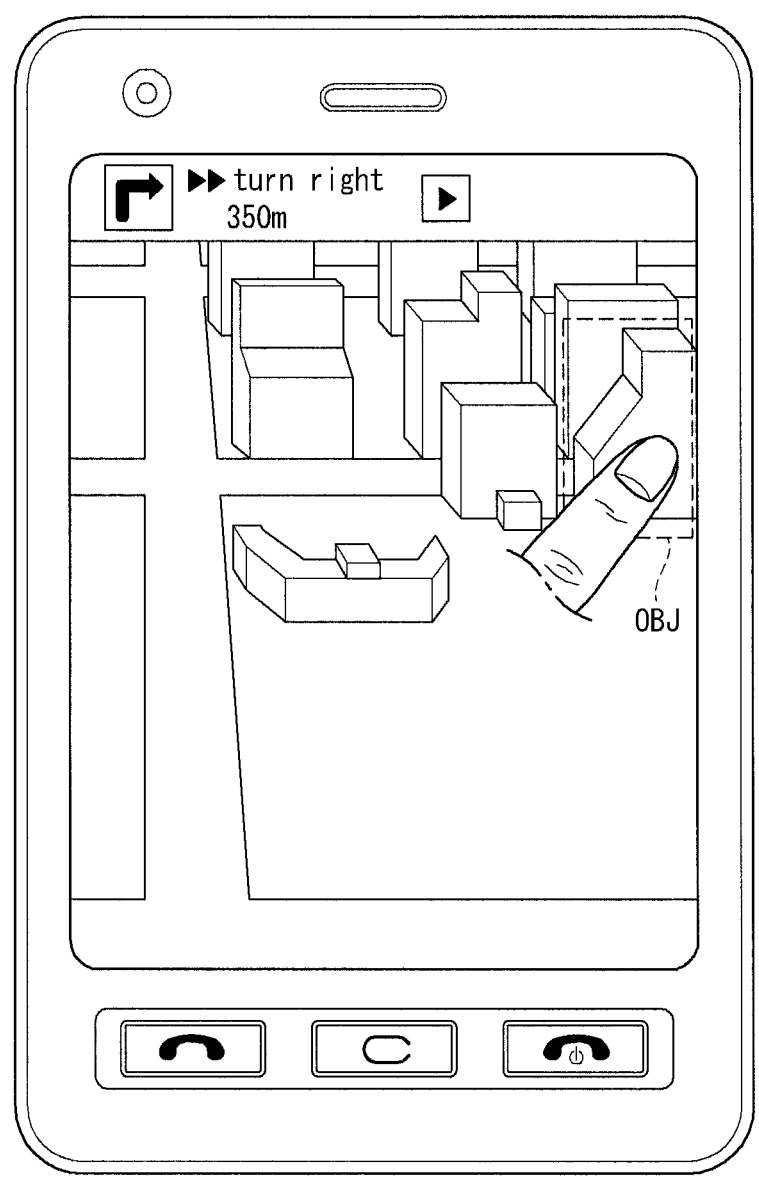
FIG. 14A through 14E illustrate 3D map images according to the fifth example embodiment.
Figure 14B:
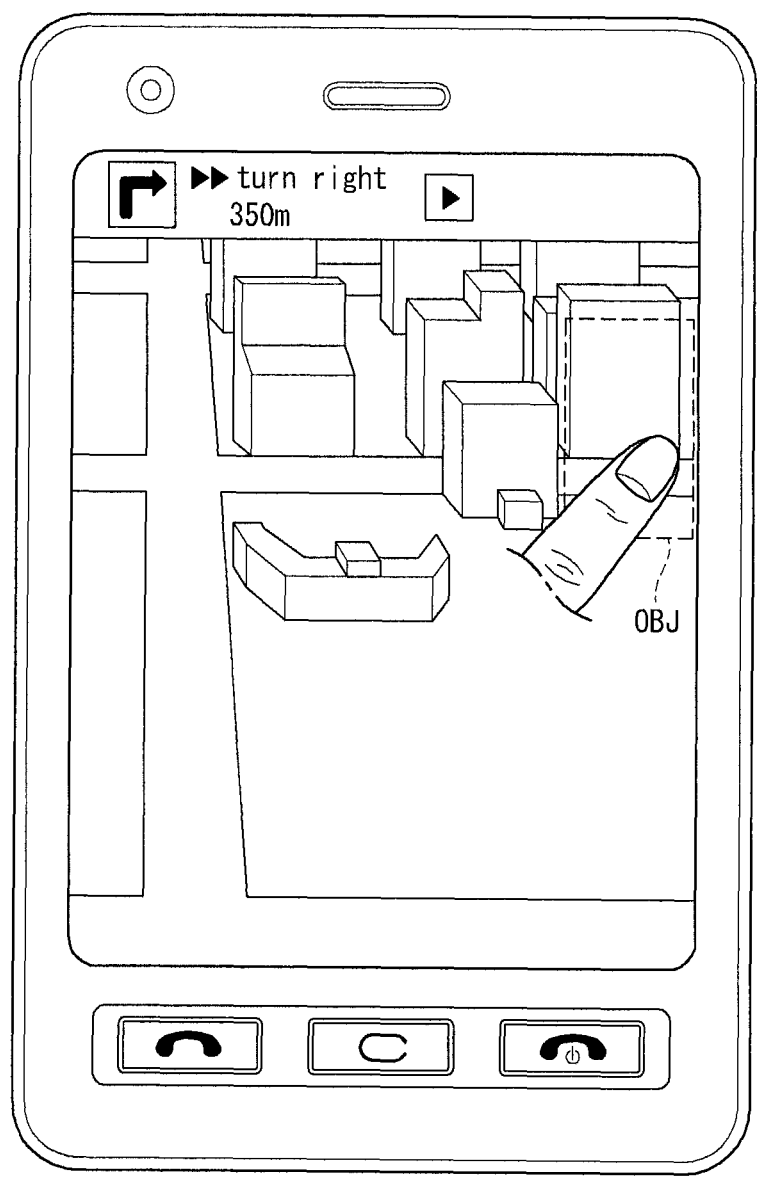
Figure 14C:
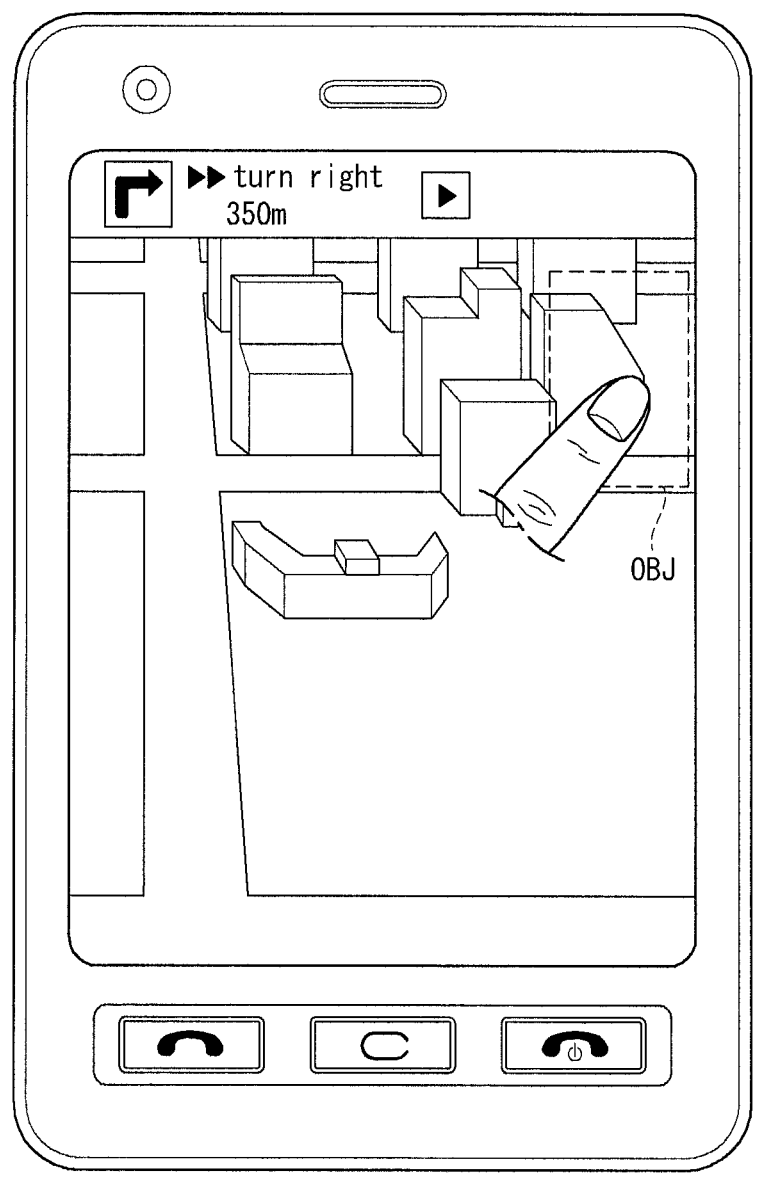
Figure 14D:
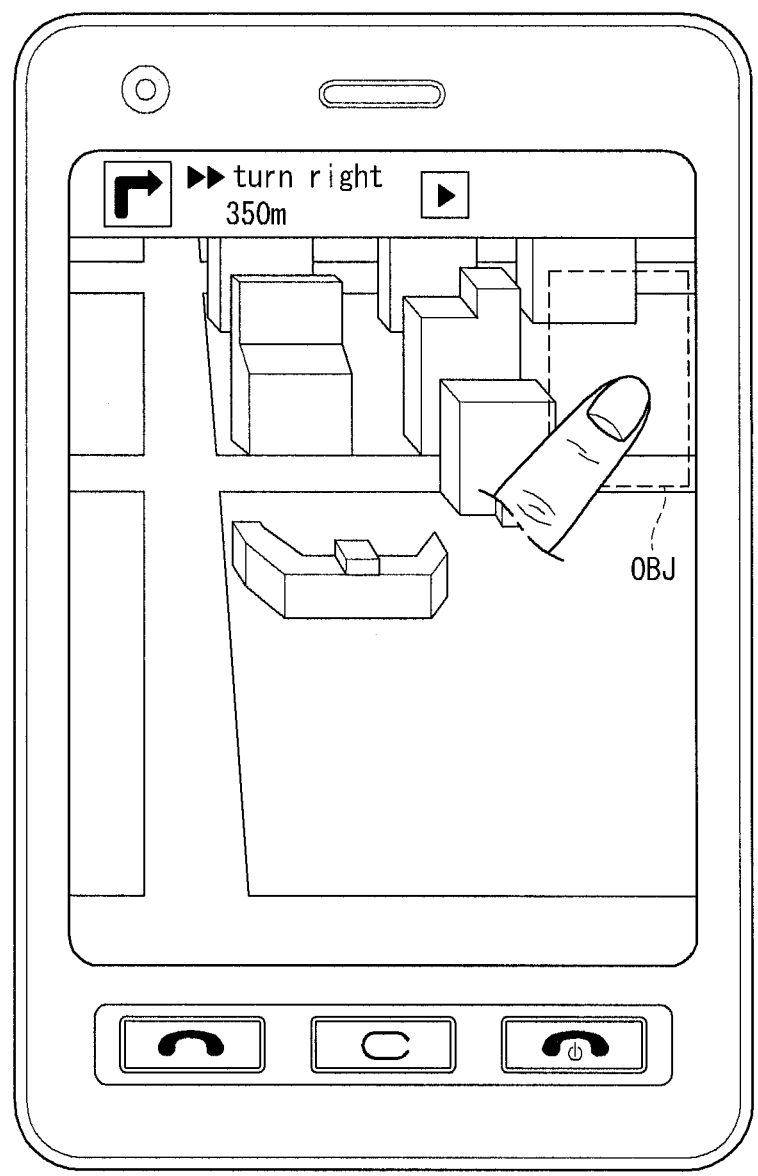
Figure 14E:
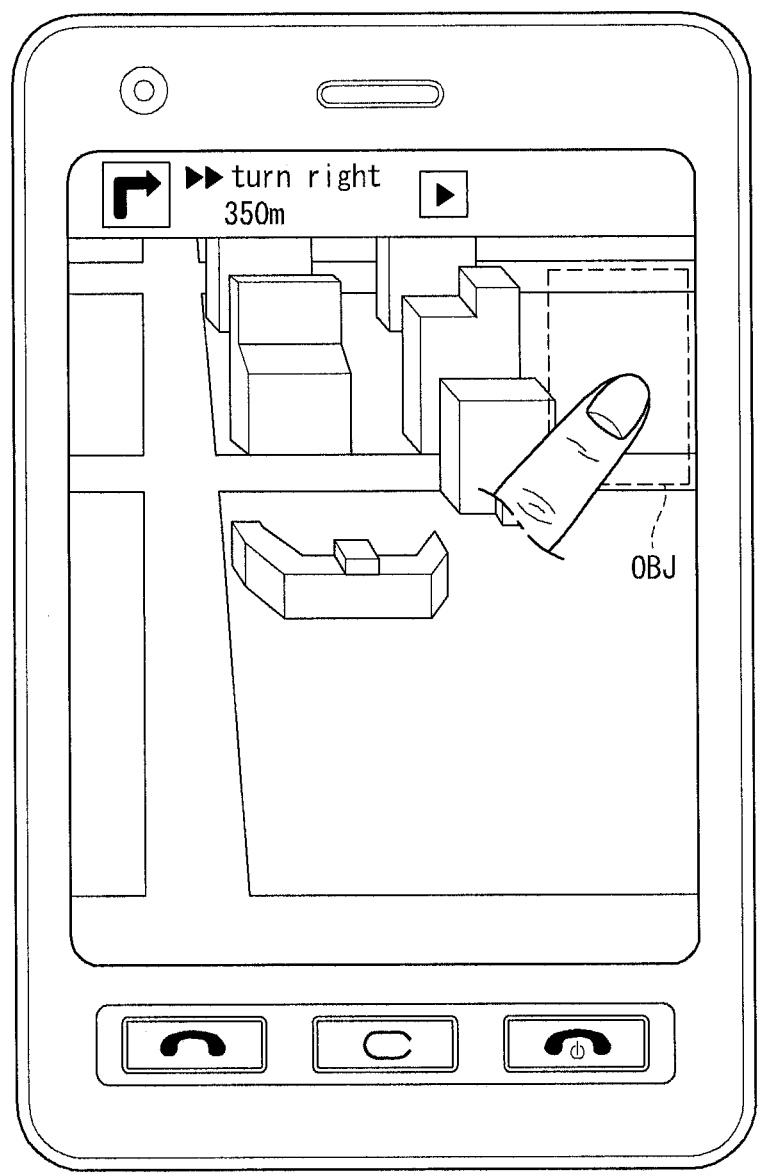

A 3D map image may be displayed on the touch screen of the mobile terminal 100, as shown in FIG. 14A. A user can select a 3D individual object OBJ on the 3D map image through a touch input or a proximity input in operation S131. Whenever a predetermined critical time elapses while the 3D individual object OBJ is being touched or proximity-touched, 3D individual objects behind the selected 3D individual object OBJ may be sequentially displayed in such a manner that the selected 3D individual object is erased, a first 3D individual object behind the selected 3D individual object OBJ is displayed, the first 3D individual object is erased and then a second 3D individual object behind the first 3D individual object is displayed in operations S132, S133 and S134. Accordingly, the user may sequentially view one or more 3D individual objects hidden behind the selected 3D individual object OBJ by maintaining the touch input or the proximity input applied to the 3D individual object OBJ.

The selected 3D individual object OBJ may include a specific object, such as a building or a natural object, and/or a specific zone that includes the specific object. Different effective sounds or haptic patterns may be set for 3D individual objects on the 3D map image based on attributes of the 3D individual objects (e.g. a road, a building, a natural object, etc.). Accordingly, the user can recognize the selected 3D individual object through the effective sound or haptic pattern set for the 3D individual object.

The first display area may display an outline between the selected 3D individual object OBJ and an unselected image surrounding the selected 3D individual object or the first display area may reduce a luminance of the unselected image and increase a luminance of the selected 3D individual object OBJ in order to easily recognize the 3D individual object OBJ when the 3D individual object OBJ is selected under control of the controller 180.

When there is no individual object to be erased anymore, all the erased individual objects may be displayed in their original states in operations S135 and S136. Operations S132 through S136 may be repeated while the 3D individual object control signal is input (i.e., while the touch input or the proximity input is maintained).

When the 3D individual object control signal is not input (i.e., the touch input or the proximity input is cancelled), the original 3D map image may be displayed in operations S137 and S138.

If the selected 3D individual object OBJ includes only a single building or natural object, operations S132 through S136 may be omitted.

The user may select, in operation S131, multiple 3D individual objects OBJ1 and OBJ2 through multiple touch inputs or multiple proximity inputs, as shown in FIG. 6. The selected 3D individual objects OBJ1 and OBJ2 and 3D individual objects at least partially hidden behind the selected 3D individual objects OBJ1 and OBJ2 may be displayed by sequentially erasing the 3D individual objects at a predetermined critical time interval while the multiple touch inputs or multiple proximity inputs are maintained.

The 3D individual object OBJ may be selected according to a key input, a jog wheel input, a trackball input and/or a joystick input in operation S131. In this example, a specific number or a pointer, such as an arrow, may designate the 3D individual object OBJ on the first display area. The user can press a key corresponding to the number of the 3D individual object OBJ to select the 3D individual object OBJ and sequentially view the 3D individual objects hidden behind the selected 3D individual object OBJ while sequentially erasing the hidden 3D individual objects when the 3D individual object control signal is input. If the 3D individual object control signal is not input anymore, the original 3D map image may be displayed in operation S138.

Figure 15:
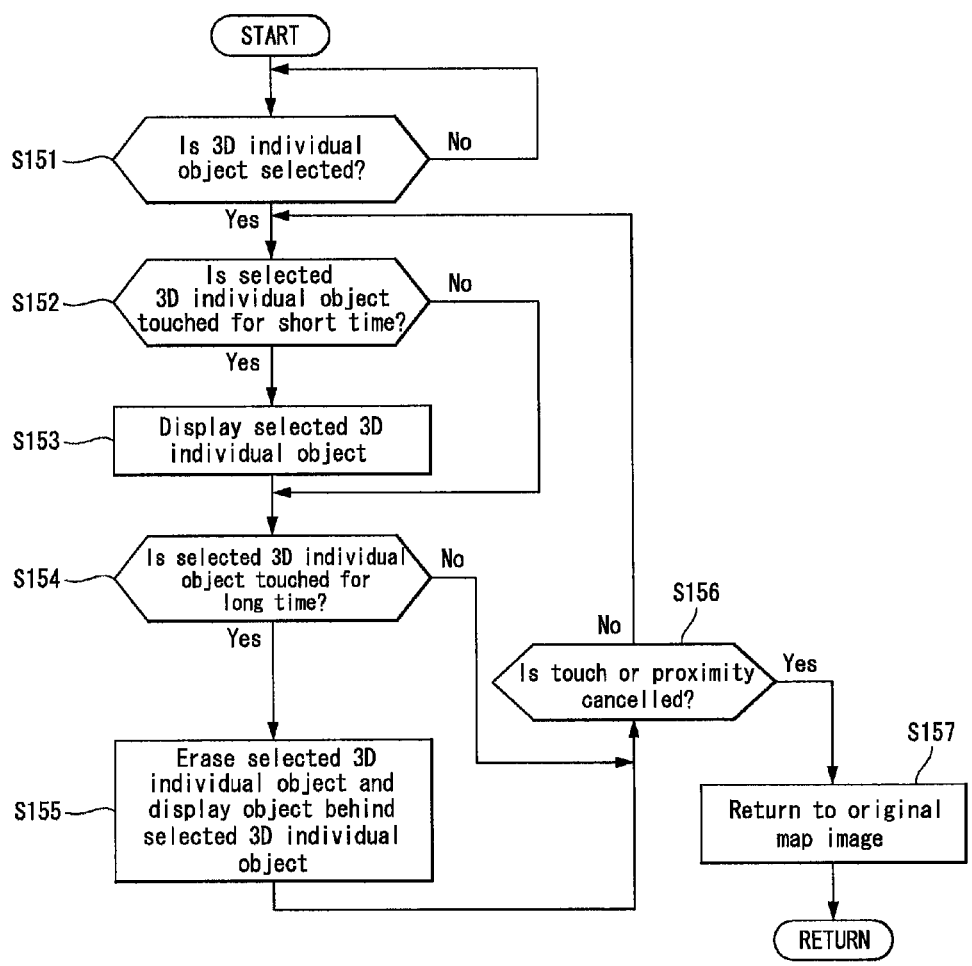
FIG. 15 is a flowchart illustrating a method of controlling a 3D individual object according to a sixth example embodiment of the present invention.

FIG. 15 is a flowchart illustrating a method of controlling a 3D individual object according to a sixth example embodiment of the present invention. The method of controlling a 3D individual object according to the sixth example embodiment may be explained with reference to FIGS. 12A and 12B. This method may be performed under control of the controller 180. Other embodiments, operations and orders of operation may also be within the scope of the present invention.

A 3D map image may be displayed on the touch screen of the mobile terminal 100, as shown in FIGS. 12A and 12B. A user can generate the 3D individual object control signal to select a 3D individual object OBJ on the 3D map image through various input devices in operation S151.

When a touch input or a proximity input is applied to the selected 3D individual object for a time shorter than the predetermined critical time, the selected 3D individual object OBJ may be displayed in operations S152 and S153. When the touch input or proximity input is applied to the selected 3D individual object OBJ for a time longer than the critical time, the selected 3D individual object OBJ may be erased and a 3D individual object at least partially hidden behind the selected 3D individual object OBJ may be displayed in operations S154 and S155. Accordingly, the user can easily view the object behind the selected 3D individual object OBJ by controlling the touch time with respect to the selected 3D individual object to erase the selected 3D individual object OBJ. Correlation of the touch time and 3D individual object control may be changed. For example, 3D individual objects may be controlled in such a manner that the selected 3D individual object is not erased when the selected 3D individual object is touched for a long time while the selected 3D individual object is erased and the 3D individual object behind the selected 3D individual object is displayed when the selected 3D individual object is touched for a short time.

The selected 3D individual object OBJ may include a specific object, such as a building or a natural object, and/or a specific zone that includes the specific object. Different effective sounds or haptic patterns may be set for 3D individual objects on the 3D map image based on attributes of the 3D individual objects (e.g. a road, a building, a natural object, etc.). Accordingly, the user can recognize the selected 3D individual object through the effective sound or haptic pattern set for the 3D individual object.

The first display area may display an outline between the selected 3D individual object OBJ and an unselected image surrounding the selected 3D individual object or the first display area may reduce a luminance of the unselected image and increase a luminance of the selected 3D individual object OBJ in order to easily recognize the 3D individual object OBJ when the 3D individual object OBJ is selected under control of the controller 180.

When the 3D individual object control signal is not input (i.e., the touch input or the proximity input is cancelled), the original 3D map image may be displayed in operations S156 and S157.

If the selected 3D individual object OBJ includes only a single building or natural object, operations S152, S153, S154 and S155 may be omitted.

The user may select, in operation S151, multiple 3D individual objects OBJ1 and OBJ2 through multiple touch inputs or multiple proximity inputs, as shown in FIG. 6. The selected 3D individual objects OBJ1 and OBJ2 may be maintained or may be erased and 3D individual objects at least partially hidden behind them may be displayed according to durations of the multiple touch inputs or multiple proximity inputs.

The 3D individual object OBJ may be selected according to a key input, a jog wheel input, a trackball input and/or a joystick input in operation S151. In this example, a specific number or a pointer, such as an arrow, may designate the 3D individual object OBJ in the first display area. The user may press a key corresponding to the number of the 3D individual object OBJ to select the 3D individual object OBJ. Further, the user can maintain the selected 3D individual object OBJ or erase the selected 3D individual object OBJ and view the 3D individual object behind the selected 3D individual object OBJ according to a duration for which the key is pressed. If the 3D individual object control signal is not input anymore, the original 3D map image may be displayed in operation S157.

Figure 16:
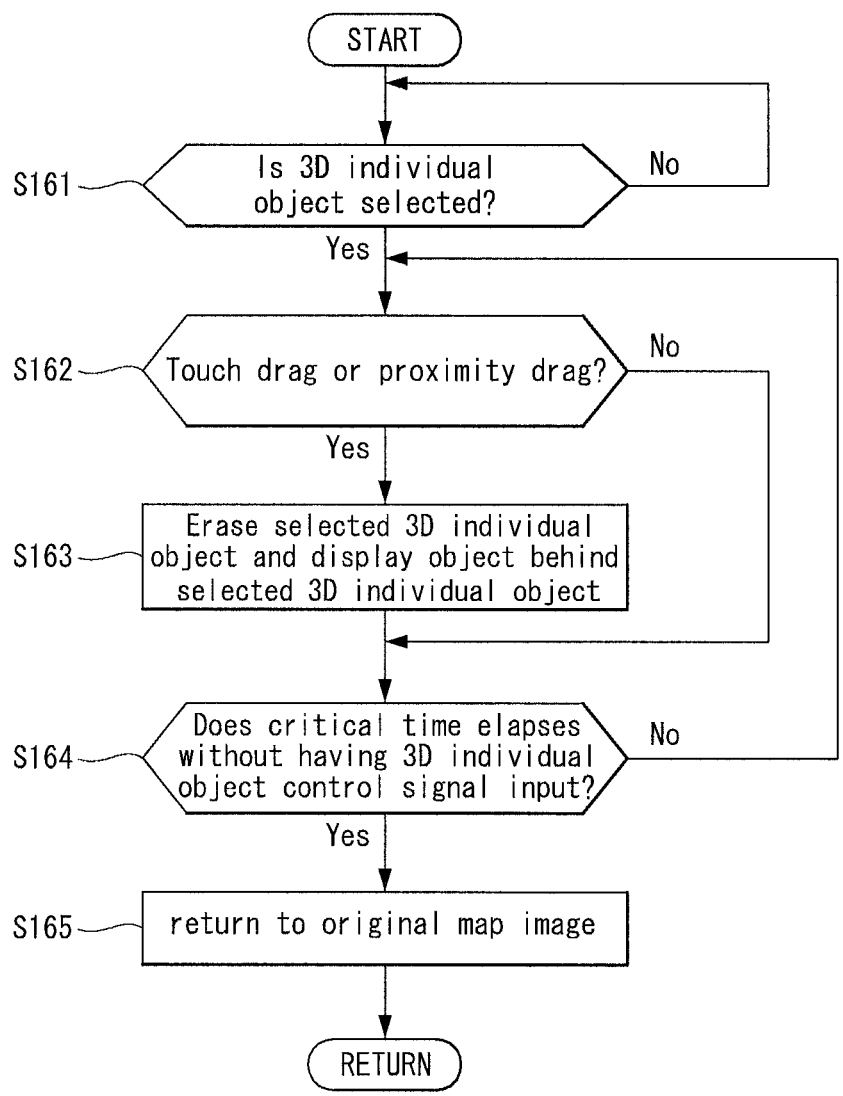
FIG. 16 is a flowchart illustrating a method of controlling a 3D individual object according to a seventh example embodiment of the present invention.
Figure 17:
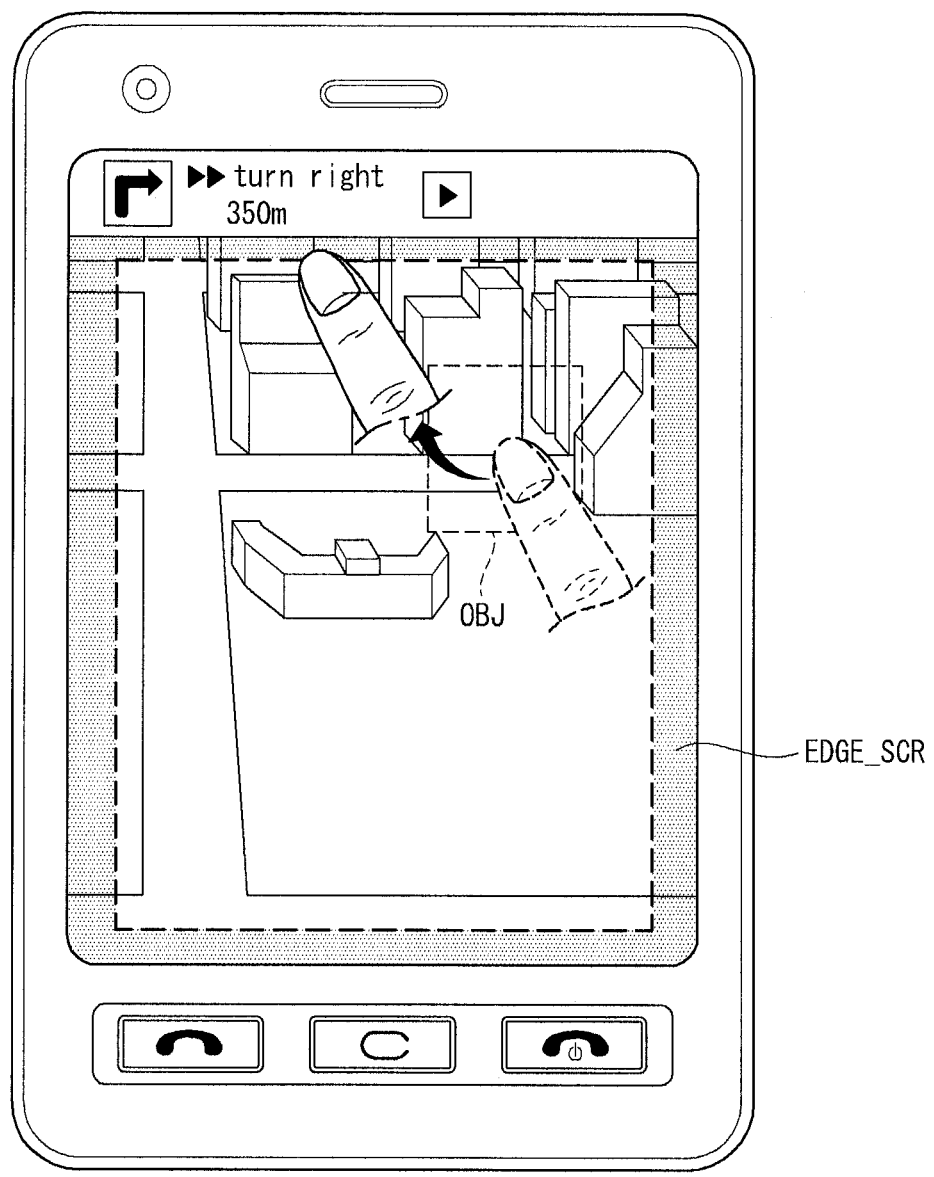
FIG. 17 illustrates a 3D map image according to the seventh example embodiment.

FIG. 16 is a flowchart illustrating a method of controlling a 3D individual object according to a seventh example embodiment of the present invention. FIG. 17 illustrates a 3D map image showing an example of the method according to the seventh example embodiment. The method may be explained with reference to FIG. 12A. This method may be performed under control of the controller 180. Other embodiments, operations and orders of operation may also be within the scope of the present invention.

A 3D map image may be displayed on the touch screen of the mobile terminal 100, as shown in FIG. 12A. A user can select a 3D individual object OBJ on the 3D map image through a touch input or a proximity input in operation S161. In addition, the user can move the selected 3D individual object OBJ to the edge EDGE_SCR of the touch screen through touch dragging or proximity dragging (or moving or copying) to erase the selected 3D individual object OBJ and view an individual object behind the selected 3D individual object OBJ in operations S162 and S163.

The selected 3D individual object OBJ may include a specific object, such as a building or a natural object, or a specific zone that includes the specific object. Different effective sounds or haptic patterns may be set for 3D individual objects on the 3D map image based on attributes of the 3D individual objects (e.g. a road, a building, a natural object, etc.). Accordingly, the user can recognize the selected 3D individual object through the effective sound or haptic pattern set for the 3D individual object.

The first display area may display an outline between the selected 3D individual object OBJ and an unselected image surrounding the selected 3D individual object or the first display area may reduce a luminance of the unselected image and increase a luminance of the selected 3D individual object OBJ in order to easily recognize the 3D individual object OBJ when the 3D individual object OBJ is selected under control of the controller 180.

When the 3D individual object control signal is not input (i.e., the touch input or the proximity input is cancelled), the original 3D map image may be displayed in operations S164 and S165.

If the selected 3D individual object OBJ includes only a single building or natural object, operations S162 and S163 may be omitted.

The user can select, in operation S161, multiple 3D individual objects OBJ1 and OBJ2 through multiple touch inputs or multiple proximity inputs, as shown in FIG. 6. The user can erase the multiple 3D individual objects OBJ1 and OBJ2 and view 3D individual objects at least partially hidden behind the 3D individual objects OBJ1 and OBJ2 only through multi-touch dragging or multi-proximity dragging (or multi-moving or multi-copying).

The 3D individual object OBJ may be selected according to a key input, a jog wheel input, a trackball input and/or a joystick input in operation S161. In this example, a specific number or a pointer, such as an arrow, may designate the 3D individual object OBJ in the first display area. The user can press a key corresponding to the number of the 3D individual object OBJ to select the 3D individual object OBJ and perform touch dragging or proximity dragging and/or operate a direction key, a cancellation key and/or a deletion key to erase the selected 3D individual object OBJ and view the 3D individual object behind the selected 3D individual object OBJ.

Figure 18:
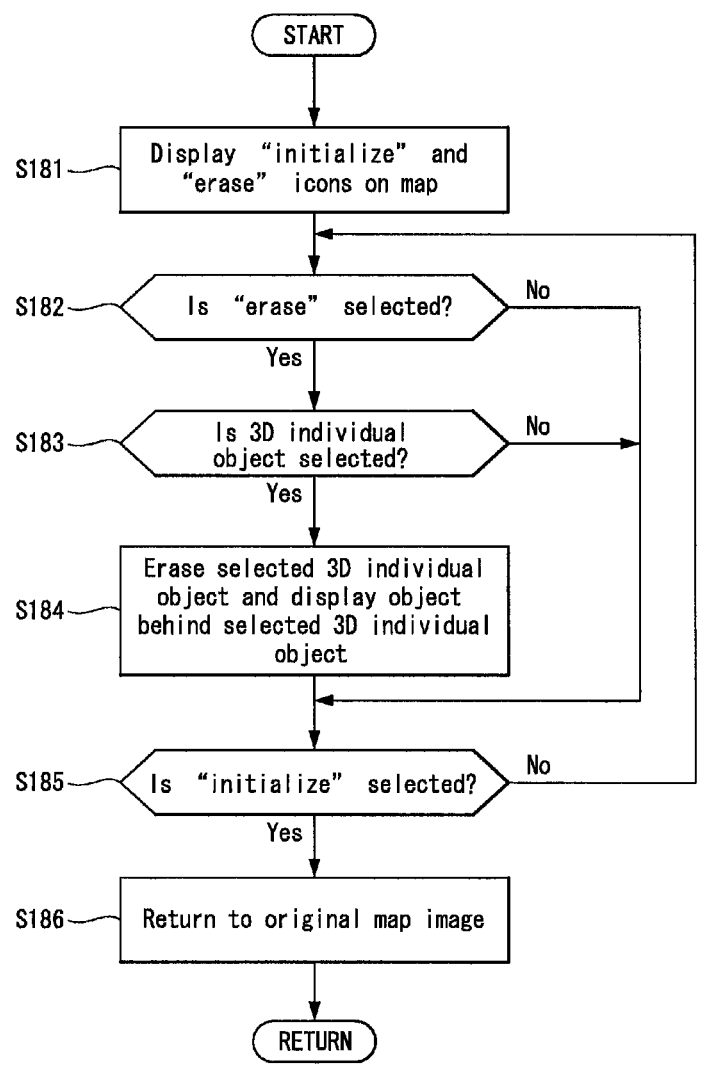
FIG. 18 is a flowchart illustrating a method of controlling a 3D individual object according to an eighth example embodiment of the present invention.
Figure 19:
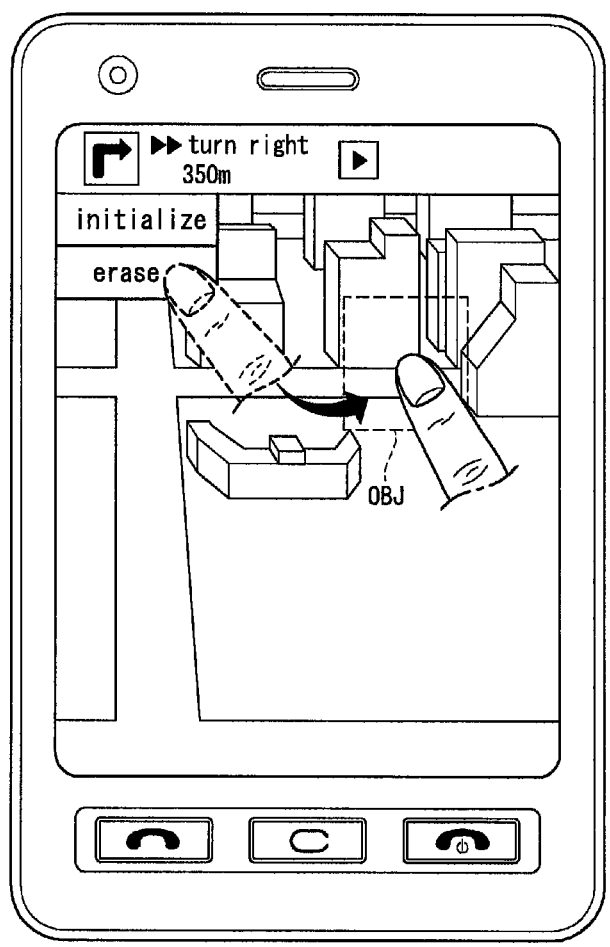
FIG. 19 illustrates a 3D map image according to the eighth example embodiment.

FIG. 18 is a flowchart illustrating a method of controlling a 3D individual object according to an eighth example embodiment of the present invention. FIG. 19 illustrates a 3D map image showing an example of the method according to the eighth example embodiment. This method may be performed under control of the controller 180. Other embodiments, operations and orders of operation may also be within the scope of the present invention.

A 3D map image is displayed on the touch screen of the mobile terminal 100, as shown in FIG. 12A, and a 3D control signal input part for controlling the 3D map image and 3D individual objects may be displayed in operation S181 on a predetermined region of the touch screen or in the second display area, as shown in FIG. 19. The 3D control signal input part may include a first input part for initializing display of the 3D map image and a second input part for erasing a selected 3D individual object and displaying a 3D individual object behind the selected 3D individual object. The first and second input parts may be displayed in the form of a text, a graphic icon and/or a combination thereof. For example, the first input part may be displayed in the form of a text "initialize" and the second input part may be displayed in the form of a text "erase", as shown in FIG. 19.

When a user requires to view a 3D individual object at least partially behind a certain 3D individual object on the 3D map image, the user may select the second input part ("erase") through a touch input or a proximity input, and then select a 3D individual object OBJ to be erased. Then, the selected 3D individual object OBJ may be automatically erased and a 3D individual object behind the selected 3D individual object OBJ may be displayed on the 3D map image in operations S182 and S184.

When the user selects the first input part ("initialize") through a touch input or a proximity input, the erased 3D individual object may be restored and the original 3D map image may be displayed in operations S185 and S186.

If the selected 3D individual object OBJ includes only a single building or a natural object, operations S182 through S186 may be omitted.

After selecting the second input part, the user may select multiple 3D individual objects OBJ1 and OBJ2 through multiple touch inputs or multiple proximity inputs, as shown in FIG. 6, and simultaneously erase the selected 3D individual objects OBJ1 and OBJ2 in operation S181. 3D individual objects at least partially hidden behind the erased 3D individual objects OBJ1 and OBJ2 may be displayed on the 3D map image.

The first and second input parts and the to-be-erased 3D individual object OBJ may be selected according to a key input, a jog wheel input, a trackball input and/or a joystick input in operation S181. In this example, different numbers or pointers, such as arrows, may designate the first and second input parts and the 3D individual object OBJ on the first display area. The user can press keys corresponding to the first and second input parts and press a key corresponding to the number of the 3D individual object OBJ to select the to-be-erased 3D individual object OBJ.

Figure 20:
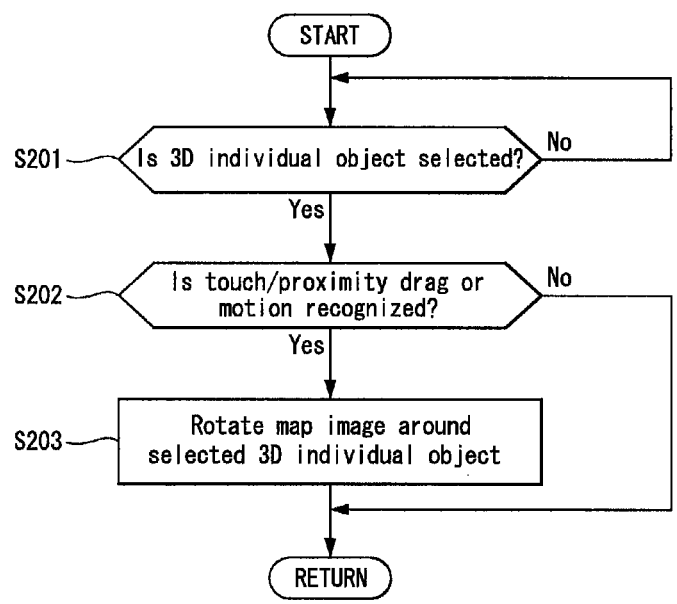
FIG. 20 is a flowchart illustrating a method of controlling a 3D individual object according to a ninth example embodiment of the present invention.
Figure 21:
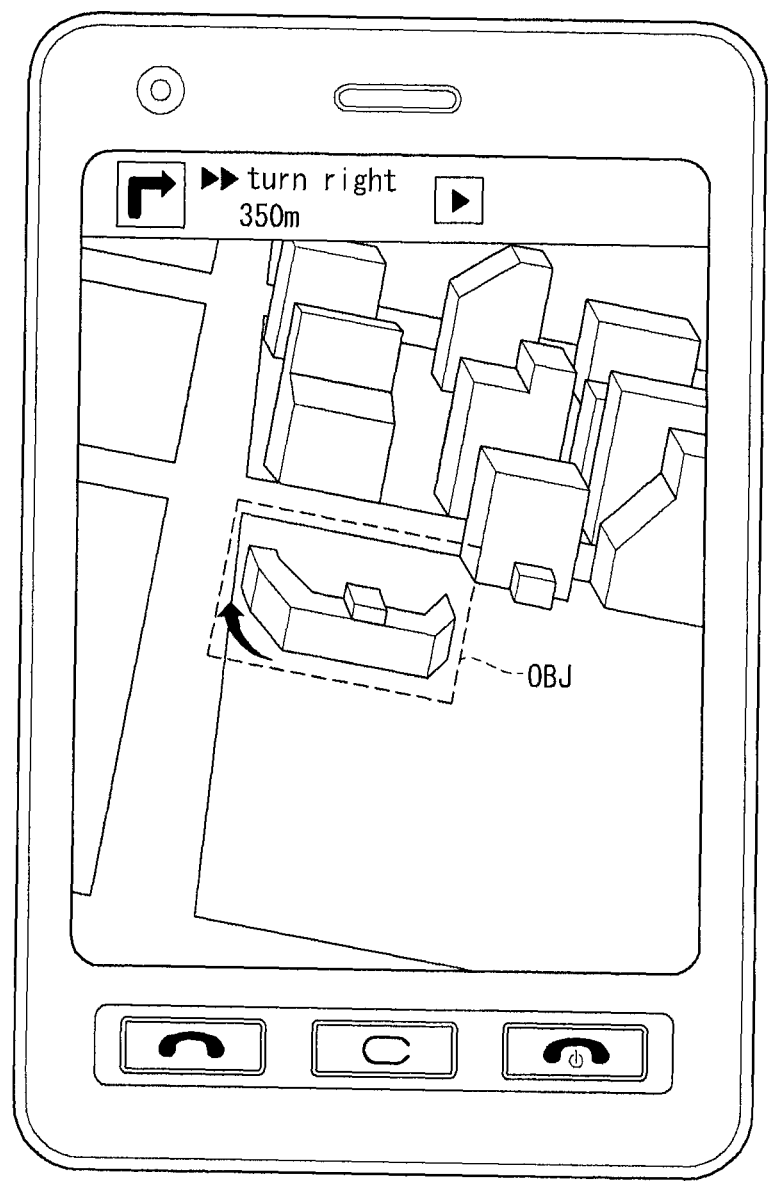
FIG. 21 illustrates a 3D map image according to the ninth example embodiment.

FIG. 20 is a flowchart illustrating a method of controlling a 3D individual object according to a ninth example embodiment of the present invention. FIG. 21 illustrates a 3D map image showing an example of the method according to the ninth example embodiment. This method may be performed under control of the controller 180. Other embodiments, operations and orders of operation may also be within the scope of the present invention.

A 3D map image may be displayed on the touch screen of the mobile terminal 100, as shown in FIG. 12A. A user can select a 3D individual object OBJ through a touch input, a proximity input and/or other various inputs in operation S201. When the user inputs the 3D individual object control signal through a motion such as touch drag, proximity drag, touch flicking or proximity flicking or moves the mobile terminal 100 (e.g. rotates the body of the mobile terminal 100), a gyro sensor that is set in the mobile terminal 100 and senses the motion of the mobile terminal 100 may generate an output signal. The proximity drag may correspond to a drag operation of a user's finger or a pen among proximity inputs applied to the mobile terminal 100 in a distance recognizable by the proximity sensor set in the mobile terminal 100. The proximity flicking may correspond to a flicking operation of a user's finger or a pen among proximity inputs applied to the mobile terminal 100 in the distance recognizable by the proximity sensor 141. The proximity drag and proximity flicking may be sensed by the proximity sensor 141 and the controller 180 may analyze the output signal of the proximity sensor 141 to distinguish the proximity drag and proximity flicking from each other. The controller 180 may analyze the output signal of the touch sensor included in the mobile terminal 100 to distinguish the touch drag and touch flicking from each other.

The controller 180 may detect a variation in the users' touch or proximity motion or a motion of the mobile terminal 100 and rotate the overall 3D map image around the selected 3D individual object OBJ in operations S202 and S203. The 3D map image may rotate in a direction of the touch or proximity motion or a direction of the motion of the mobile terminal 100 at a same speed as the motion speed. Accordingly, the user may set the center of rotation of the 3D map image and rotate the 3D map image simultaneously.

The user can select, in operation S201, multiple 3D individual objects OBJ1 and OBJ2 through multiple touch inputs or multiple proximity inputs, as shown in FIG. 6. In this example, the 3D map image may rotate having the center point between the selected 3D individual objects OBJ1 and OBJ2 as a center of rotation.

Figure 22:
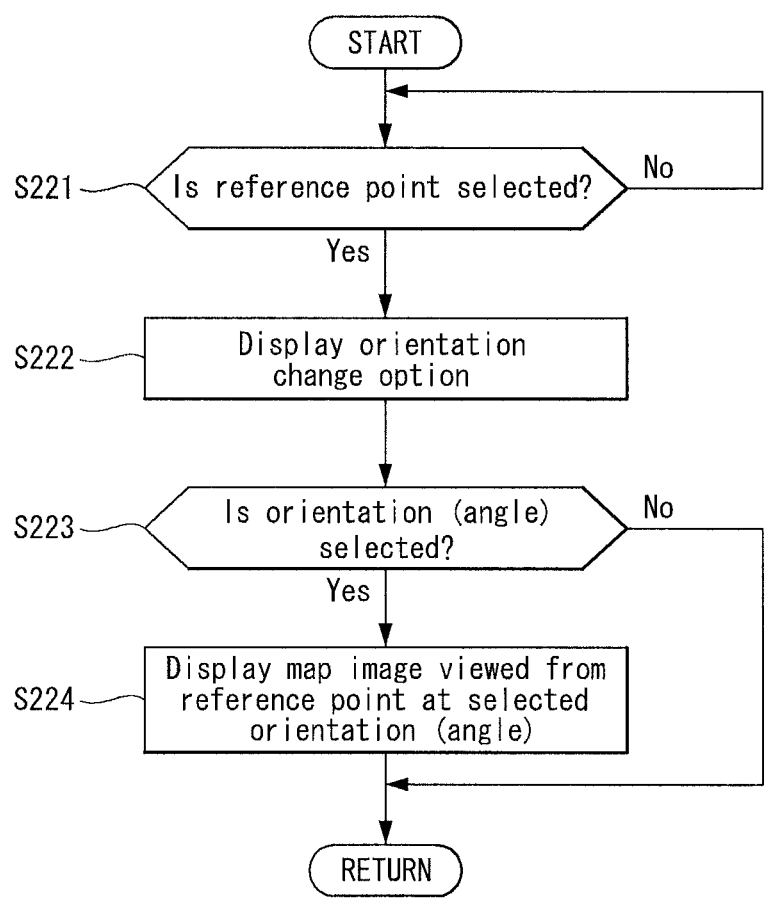
FIG. 22 is a flowchart illustrating a method of controlling a 3D individual object according to a tenth example embodiment of the present invention.
Figure 23:
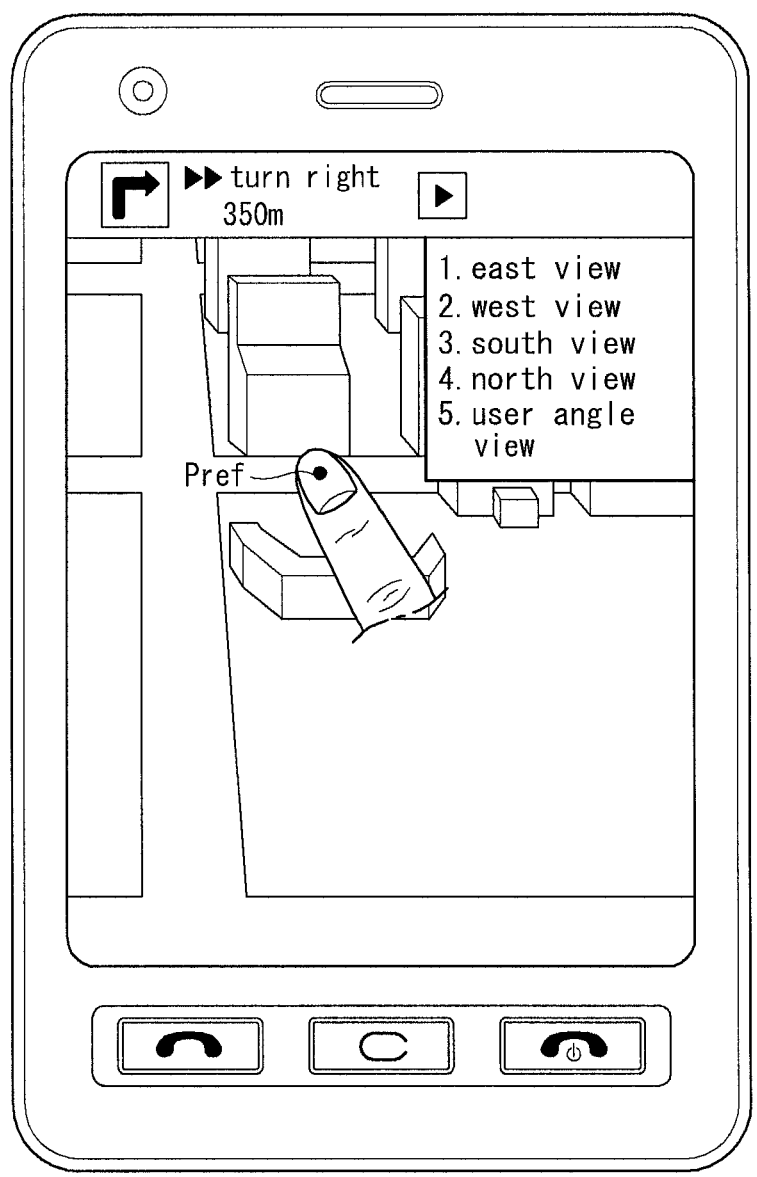
FIG. 23 illustrates a 3D map image according to the tenth example embodiment.

FIG. 22 is a flowchart illustrating a method of controlling a 3D individual object according to a tenth example embodiment of the present invention. FIG. 23 illustrates a 3D map image showing an example of the method according to the tenth example embodiment. This method may be performed under control of the controller 180. Other embodiments, operations and orders of operation may also be within the scope of the present invention.

A 3D map image and an orientation change option pop-up window for orientation change of the view pointer direction of the 3D map image may be displayed on the touch screen of the mobile terminal 100, as shown in FIG. 23, in operations S221 and S222. The orientation change option pop-up window may be displayed in the form of a text, a graphic icon and/or a combination thereof. For example, the orientation change option pop-up window may include text selection items "east view", "west view", "south view", "north view" and "user angle view", as shown in FIG. 23.

When the user wants to rotate the overall 3D map image, the user may select an orientation change reference point Pref on the 3D map image through a touch input, a proximity input and/or other inputs and choose a desired orientation through the orientation change option pop-up window in operation S223. The 3D map image viewed when the user sees the orientation change reference point Pref in the selected orientation is displayed in operation S224. The 3D map image may rotate to the selected orientation or may be displayed without rotating to the selected orientation. When the user selects "user angle view", the 3D map image may be displayed at a user angle previously stored in the memory 160. To input the user angle, the user may input a desired orientation angle through an input pop-up window newly displayed on the 3D map image. When the user angle is selected, the 3D map image viewed when the user sees the orientation change reference point Pref at the user angle may be displayed.

An option window through which the view point of the 3D map image can be changed based on 3D individual objects displayed on the 3D map image may replace the orientation change option pop-up window. For example, when the 3D map image currently displayed on the mobile terminal 100 includes "XXX mountain", "XXX tower" and "XXX park", identification names of the 3D individual objects may be displayed. In this example, the user can select the reference point Pref and a desired 3D individual object identification name ("XXX mountain", "XXX tower" or "XXX park") through an option window to display the 3D map image viewed when the user sees the selected 3D individual object from the reference point Pref.

An embodiment of changing the view point of the 3D map image may be applied to the mobile terminal 100 together with the above-described embodiments. For example, the view point of the overall 3D map image displayed on the mobile terminal 100 can be changed according to users' choice, detailed information on a 3D individual object selected by the user from 3D individual objects included in the 3D map image can be displayed, the selected 3D individual object can be erased and a 3D individual object at least partially hidden behind the selected 3D individual object can be displayed.

Figure 24:
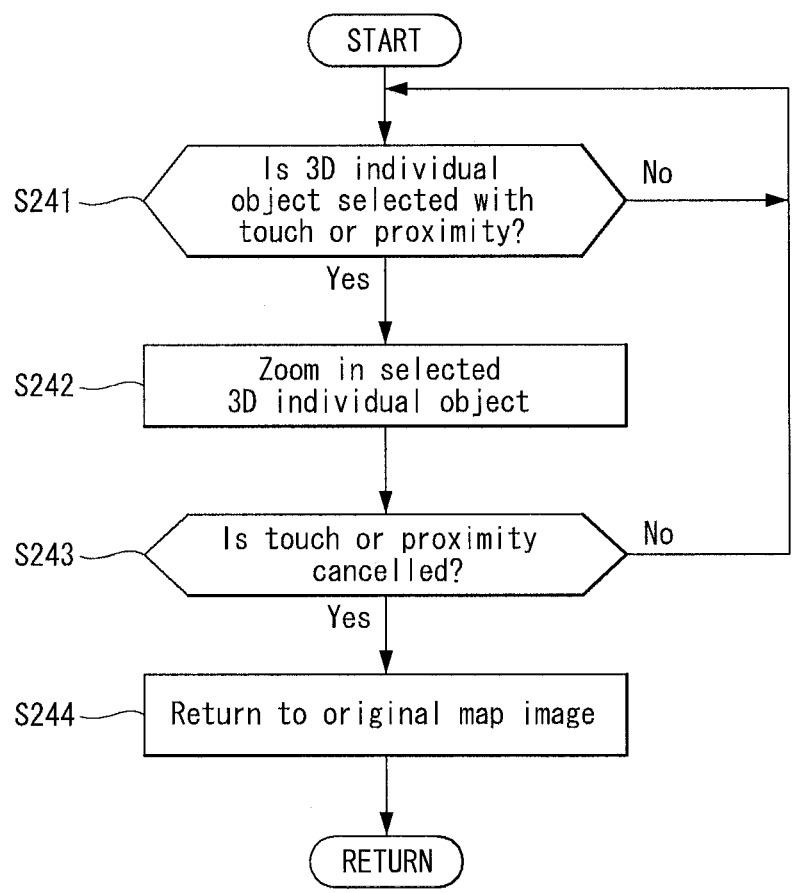
FIG. 24 is a flowchart illustrating a method of controlling a 3D individual object according to an eleventh example embodiment of the present invention.

FIG. 24 is a flowchart illustrating a method of controlling a 3D individual object according to an eleventh example embodiment of the present invention. The method of controlling a 3D individual object according to the eleventh example embodiment may be explained with reference to FIGS. 26A and 26B. This method may be performed under control of the controller 180. Other embodiments, operations and orders of operation may also be within the scope of the present invention.

Figure 26A:
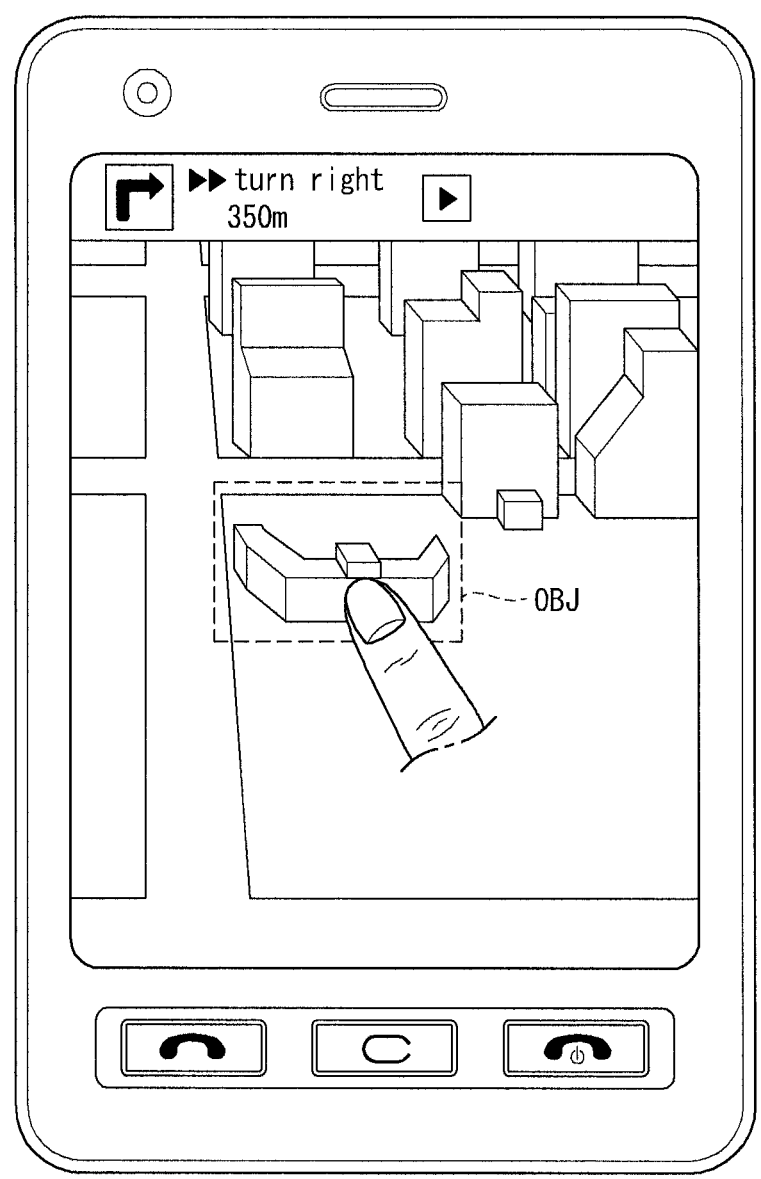
FIGS. 26A, 26B and 26C illustrate 3D map images according to the eleventh, twelfth and thirteenth example embodiments.
Figure 26B:
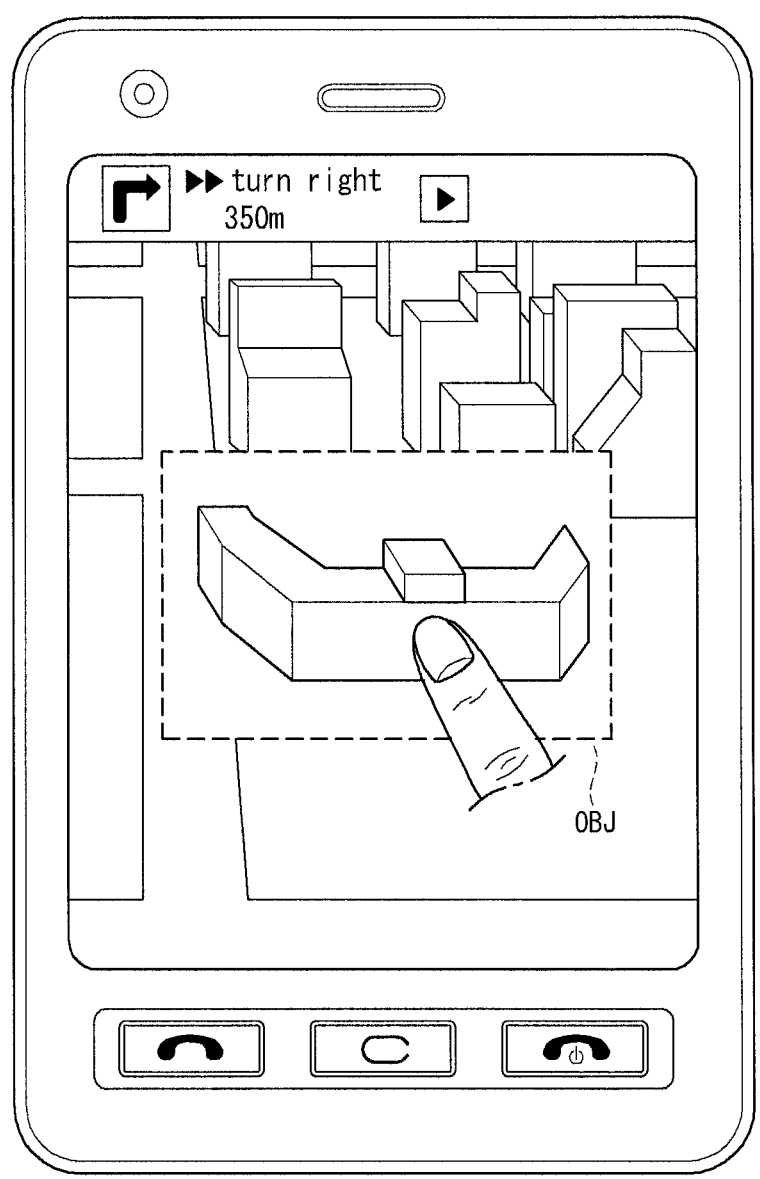

A 3D map image may be displayed on the touch screen of the mobile terminal 100, as shown in FIG. 26A. A user can select a 3D individual object OBJ on the 3D map image through a touch input or a proximity input in operation S241. The selected 3D individual object OBJ may be automatically zoomed in with predetermined magnification and displayed, as shown in FIG. 26B, in operation S242. Accordingly, the user can zoom in and view a desired 3D individual object on the 3D map image only with the touch input or the proximity input.

The selected 3D individual object OBJ may include a specific object, such as a building or a natural object, or a specific zone that includes the specific object. Different effective sounds or haptic patterns may be set for 3D individual objects on the 3D map image based on attributes of the 3D individual objects (e.g. a road, a building, a natural object, etc.). Accordingly, the user can recognize the selected 3D individual object through the effective sound or haptic pattern set for the 3D individual object.

An outline may be displayed between the selected 3D individual object OBJ and an unselected image surrounding the selected 3D individual object. A luminance of the selected 3D individual object OBJ may be greater than a luminance of the unselected image.

The selected 3D individual object OBJ may be zoomed in on the 3D map image displayed in the first display area or may be zoomed in and displayed in the second display area.

When the touch input or proximity input is cancelled, the selected 3D individual object may be zoomed out to its original size on the 3D map image in operations S243 and S344.

The user can select multiple 3D individual objects OBJ1 and OBJ2 through multiple touch inputs or multiple proximity inputs, as shown in FIG. 6, and simultaneously zoom in the selected 3D individual objects OBJ1 and OBJ2 in operation S241.

If the 3D individual object selected in operation S241 is a zoom-in object, the selected 3D individual object may be zoomed out with predetermined magnification or the original magnification in operation S242.

The 3D individual object OBJ may be selected according to a key input, a jog wheel input, a trackball input and/or a joystick input as well as the touch input or the proximity input in operation S241. In this example, a specific number or a pointer, such as an arrow, may designate the 3D individual object OBJ in the first display area. The user can press a key corresponding to the number of the 3D individual object OBJ to select the 3D individual object OBJ and automatically zoom in or zoom out the selected 3D individual object OBJ. When the 3D individual object control signal is not input, the original 3D map image may be displayed in operation S244.

Figure 25:
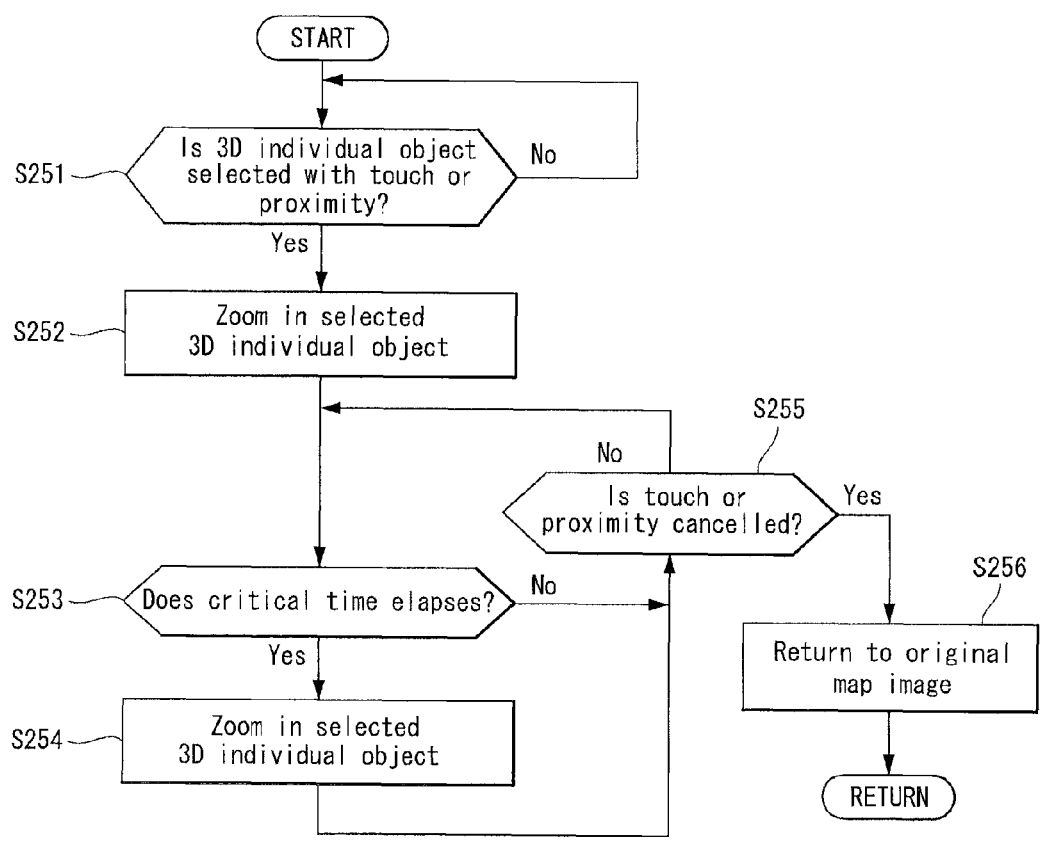
FIG. 25 is a flowchart illustrating a method of controlling a 3D individual object according to a twelfth example embodiment of the present invention.

FIG. 25 is a flowchart illustrating a method of controlling a 3D individual object according to a twelfth example embodiment of the present invention. The method of controlling a 3D individual object according to the twelfth example embodiment may be explained with reference to FIGS. 26A, 26B and 26C. The method may be performed under control of the controller 180. Other embodiments, operations and orders of operation may also be within the scope of the present invention.

Figure 26C:
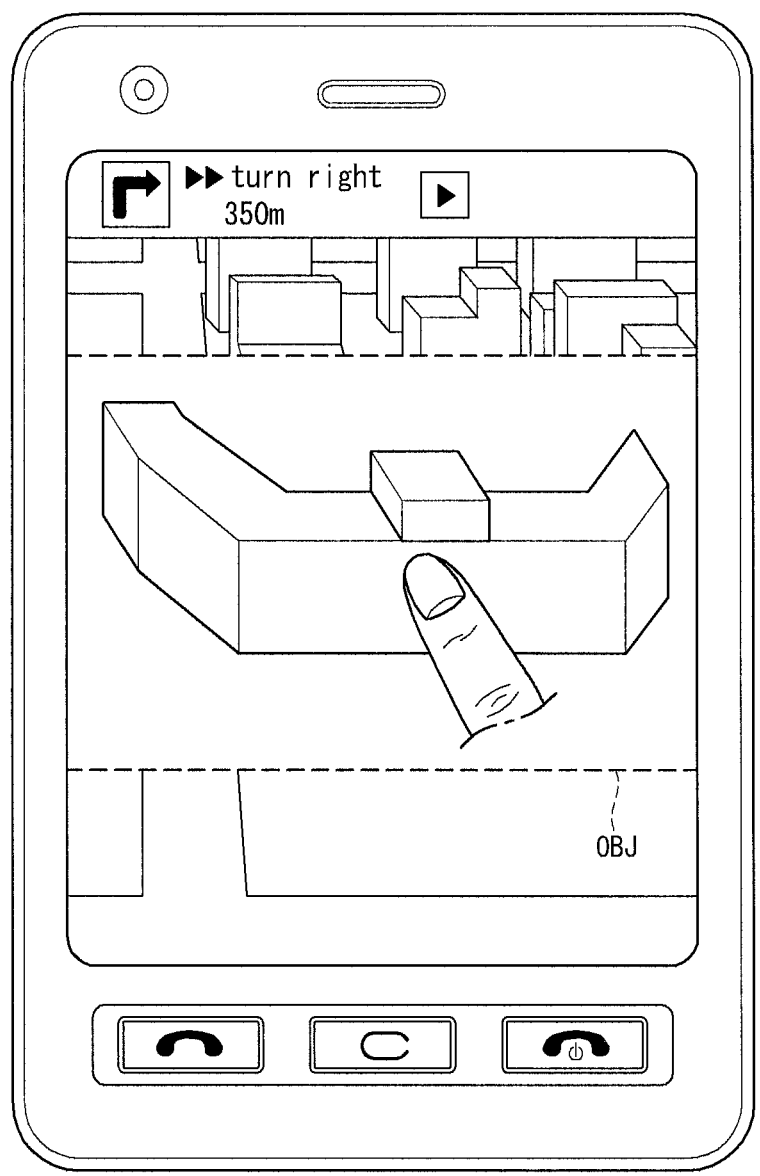

A 3D map image may be displayed on the touch screen of the mobile terminal 100, as shown in FIG. 26A. A user can select a 3D individual object OBJ on the 3D map image through a touch input or a proximity input in operation S251. When a predetermined critical time elapses while the touch input or the proximity input is maintained, the selected 3D individual object OBJ may be gradually zoomed in to the size corresponding to the entire screen with predetermined magnification and displayed, as shown in FIGS. 26A, 26B and 26C, in operations S252, S253 and S254. Accordingly, the user can zoom in a desired 3D individual object on the 3D map image only with the touch input or the proximity input and control the zoom-in magnification and size according to duration of the touch input or proximity input.

The selected 3D individual object OBJ may include a specific object, such as a building or a natural object, or a specific zone that includes the specific object. Different effective sounds or haptic patterns may be set for 3D individual objects on the 3D map image based on attributes of the 3D individual objects (e.g. a road, a building, a natural object, etc.). Accordingly, the user can recognize the selected 3D individual object through the effective sound or haptic pattern set for the 3D individual object.

An outline may be displayed between the selected 3D individual object OBJ and an unselected image surrounding the selected 3D individual object. A luminance of the selected 3D individual object OBJ may be greater than a luminance of the unselected image.

The selected 3D individual object OBJ may be zoomed in on the 3D map image displayed in the first display area or may be zoomed in and displayed in the second display area.

When the touch input or proximity input is cancelled, the selected 3D individual object may be zoomed out to its original size on the 3D map image in operations S255 and S256.

The user may select multiple 3D individual objects OBJ1 and OBJ2 through multiple touch inputs or multiple proximity inputs, as shown in FIG. 6, simultaneously zoom in the selected 3D individual objects OBJ1 and OBJ2 and automatically control the zoom-in magnification according to durations of the touch inputs or proximity inputs respectively corresponding to the 3D individual objects OBJ1 and OBJ2 in operation S251.

If the 3D individual object selected in operation S251 is a zoom-in object, the selected 3D individual object may be zoomed out with predetermined magnification or the original magnification in operation S252. Further, the user can automatically control zoom-out magnification of the selected 3D individual object (objects) according to duration of the touch input or the proximity input.

The 3D individual object OBJ may be selected, in operation S251, according to a key input, a jog wheel input, a trackball input or a joystick input as well as the touch input or the proximity input. In this example, a specific number or a pointer, such as an arrow, may designate the 3D individual object OBJ in the first display area. The user can press a key corresponding to the number of the 3D individual object OBJ to select the 3D individual object OBJ, automatically zoom in or zoom out the selected 3D individual object OBJ and control a duration for which the key is pressed to adjust zoom-in magnification and/or zoom-out magnification. When the 3D individual object control signal is not input, the original 3D map image may be displayed in operation S256.

Figure 27:
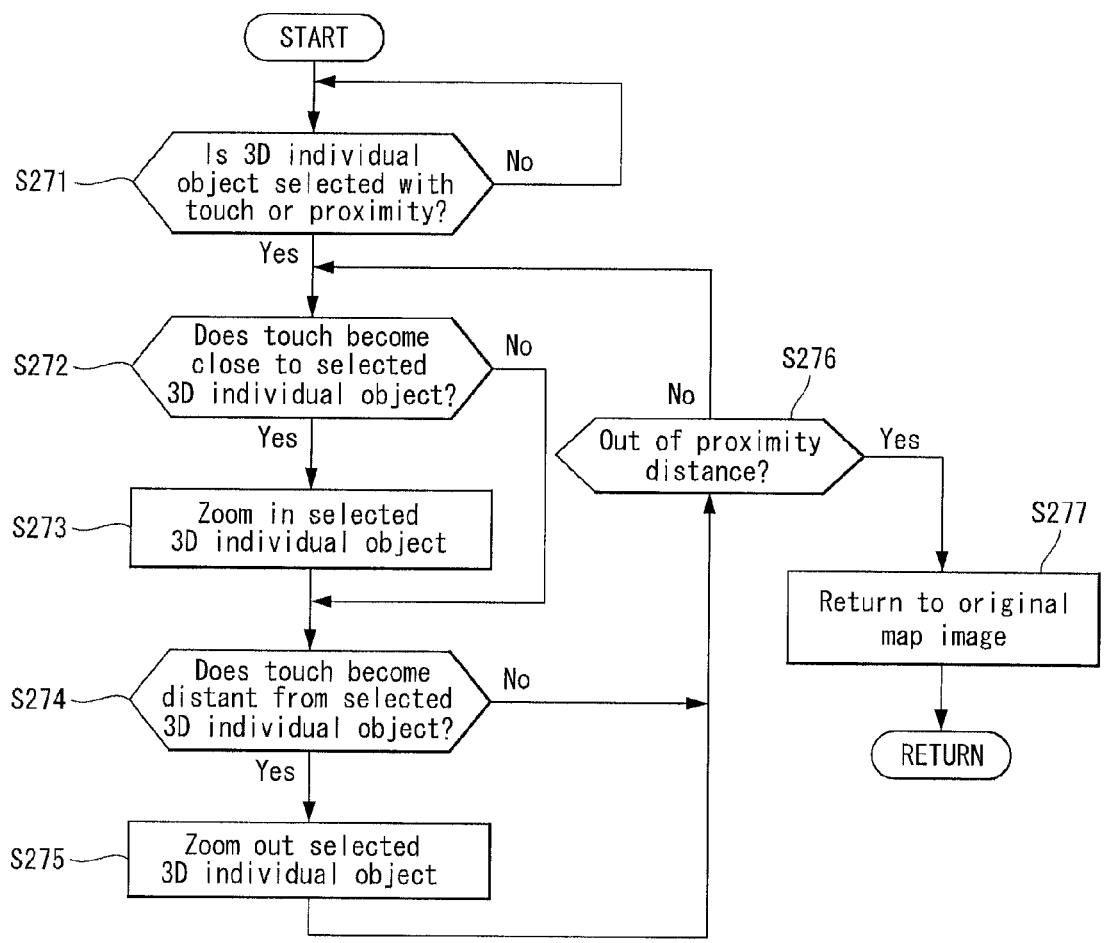
FIG. 27 is a flowchart illustrating a method of controlling a 3D individual object according to a thirteenth example embodiment of the present invention.

FIG. 27 is a flowchart illustrating a method of controlling a 3D individual object according to a thirteenth example embodiment of the present invention. The method of controlling a 3D individual object according to the thirteenth example embodiment may be explained with reference to FIGS. 26A, 26B and 26C. This method is performed under control of the controller 180. Other embodiments, operations and orders of operation may also be within the scope of the present invention.

A 3D map image may be displayed on the touch screen of the mobile terminal 100, as shown in FIG. 26A. A user can select a 3D individual object OBJ on the 3D map image through a touch input or a proximity input in operation S271. The selected 3D individual object OBJ may be zoomed in or zoomed out according to a proximity distance between proximity touch and the touch screen and zoom-in magnification and zoom-out magnification may be automatically adjusted according to the proximity distance in operations S272, S273, S274 and S275. For example, the selected 3D individual object OBJ may be zoomed in as a user's finger or a stylus pen comes close to the selected 3D individual object OBJ and zoomed out as the user's finger or stylus pen becomes distant from the selected 3D individual object OBJ at a recognizable proximity distance. Otherwise, the selected 3D individual object OBJ may be zoomed out as the user's finger or stylus pen comes close to the selected 3D individual object OBJ and zoomed in as the user's finger or stylus pen becomes distant from the selected 3D individual object OBJ at the recognizable proximity distance.

The selected 3D individual object OBJ may include a specific object, such as a building or a natural object, or a specific zone that includes the specific object. Different effective sounds or haptic patterns may be set for 3D individual objects on the 3D map image based on attributes of the 3D individual objects (e.g. a road, a building, a natural object, etc.). Accordingly, the user can recognize the selected 3D individual object through the effective sound or haptic pattern set for the 3D individual object.

An outline may be displayed between the selected 3D individual object OBJ and an unselected image surrounding the selected 3D individual object. A luminance of the selected 3D individual object OBJ may be greater than a luminance of the unselected image.

The selected 3D individual object OBJ may be zoomed in on the 3D map image displayed in the first display area or may be zoomed in and displayed in the second display area.

When the proximity touch applied to the selected 3D individual object OBJ becomes out of the recognizable proximity distance, the selected 3D individual object OBJ may be zoomed in or out to its original size on the 3D map image in operations S276 and S277.

The user can select multiple 3D individual objects OBJ1 and OBJ2 through multiple touch inputs or multiple proximity inputs, as shown in FIG. 6, simultaneously zoom in the selected 3D individual objects OBJ1 and OBJ2 and adjust proximity distances with respect to the selected 3D individual objects OBJ1 and OBJ2 to automatically control zoom-in magnification and zoom-out magnification in operation S271.

The operations of controlling zoom-in and zoom-out of the selected 3D individual object, described with reference to FIGS. 24 through 27, may be applied to the mobile terminal 100 together with the above described embodiments. For example, a view point of the 3D map image displayed on the mobile terminal 100 can be changed in a direction the user desires, detailed information on a 3D individual object selected by the user from 3D individual objects included in the 3D map image can be displayed, the selected 3D individual object can be erased and a 3D individual object at least partially hidden behind the selected 3D individual object can be displayed.

Figure 29A:
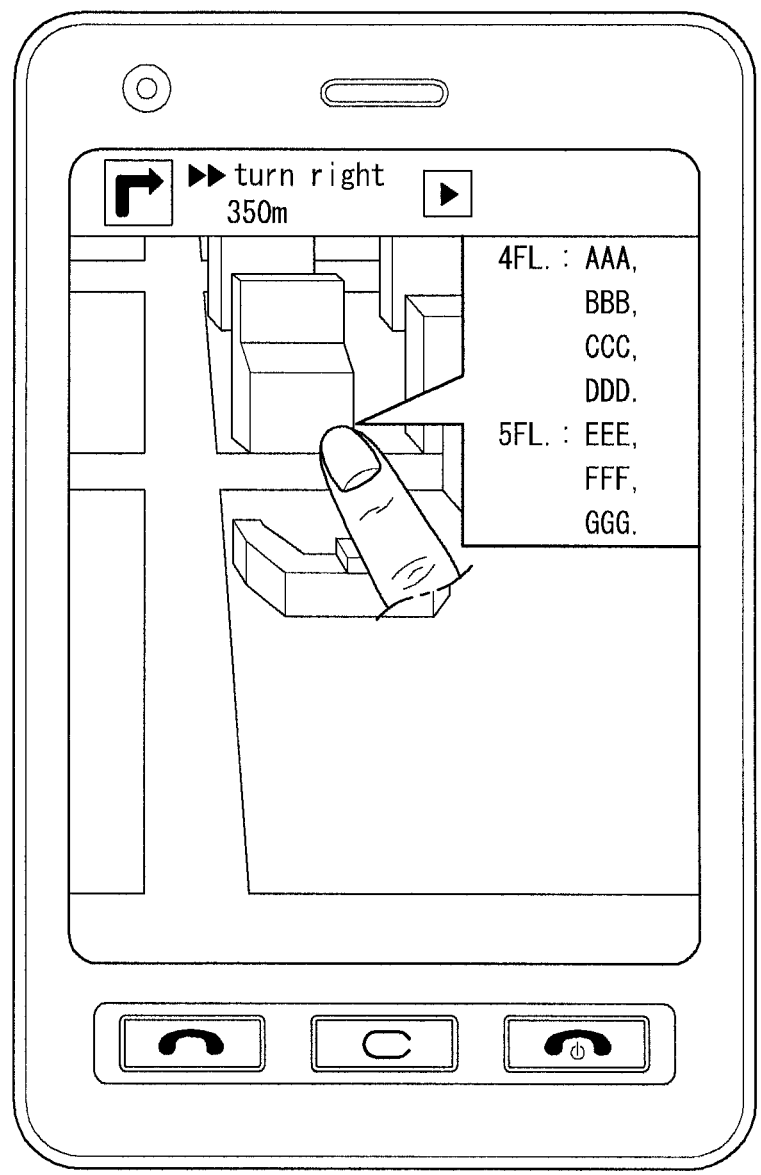
FIGS. 29A and 29B illustrate 3D map images according to the fourteenth and fifteenth example embodiments.
Figure 29B:
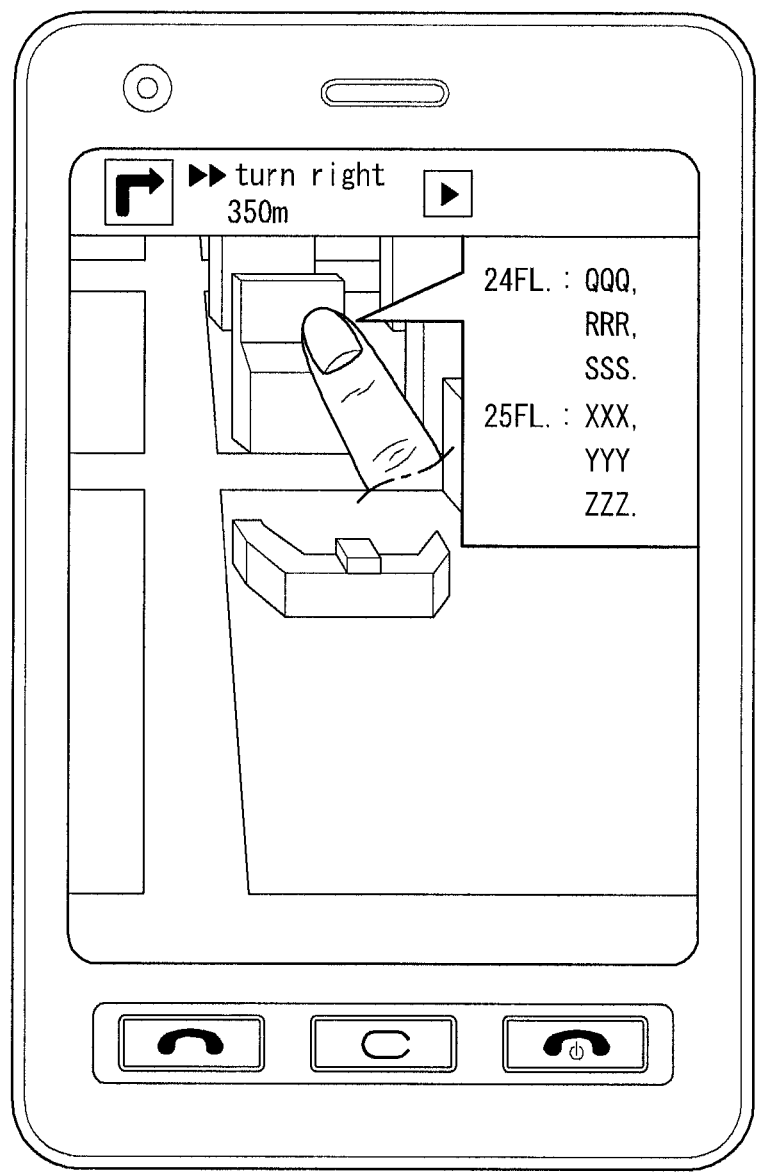

FIG. 28 is a flowchart illustrating a method of controlling a 3D individual object according to a fourteenth example embodiment of the present invention. FIGS. 29A and 29B illustrate 3D map images showing an example of the method according to the fourteenth example embodiment. This method may be performed under control of the controller 180. Other embodiments, operations and orders of operation may also be within the scope of the present invention.

A 3D map image may be displayed on the touch screen of the mobile terminal 100, as shown in FIG. 29A. When the 3D map image is touched or is proximity-touched, a 3D individual object OBJ corresponding to the touched point in the 3D map image may be automatically selected and detailed information on the selected 3D individual object OBJ may be automatically displayed in operation S281. The controller 180 of the mobile terminal 100 may read the detailed information on the selected 3D individual object OBJ from the memory 160 and display the detailed information in the first or second display area in operations S282 and S283. The displayed detailed information may include tourism information, detailed floor information, bookmark information and transportation information associated with the selected 3D individual object OBJ.

FIGS. 29A and 29B illustrate detailed floor information of a building when a selected 3D individual object OBJ corresponds to the building. If points touched or proximity-touched by a user's finger or a stylus pen correspond to fourth and fifth floors of the building, for example, detailed information such as names and types of business enterprises residing in the building can be displayed in a pop-up window displayed on the 3D map image or in the second display area. The user may zoom in or zoom out the selected 3D individual object OBJ and view the detailed information on the 3D individual object OBJ, as described with respect to FIGS. 24 through 27.

The selected 3D individual object OBJ may include a specific object, such as a building or a natural object, or a specific zone that includes the specific object.

Different effective sounds or haptic patterns may be set for 3D individual objects on the 3D map image based on attributes of the 3D individual objects (e.g. a road, a building, a natural object, etc.). Accordingly, the user may recognize the selected 3D individual object through the effective sound or haptic pattern set for the 3D individual object.

The first display area may display an outline between the selected 3D individual object OBJ and an unselected image surrounding the selected 3D individual object or the first display area may reduce a luminance of the unselected image and increase a luminance of the selected 3D individual object OBJ in order to easily recognize the 3D individual object OBJ when the 3D individual object OBJ is selected under control of the controller 180. When the 3D individual object OBJ is selected, detailed information on the selected 3D individual object OBJ may be displayed in the second display area RIW.

When the touch or proximity-touch applied to the selected 3D individual object OBJ is cancelled, detailed information on the selected 3D individual object may disappear from the touch screen and the original 3D map image may be displayed on the touch screen in operations S284 and S285.

The user can select multiple 3D individual objects OBJ1 and OBJ2 through multiple touch inputs or multiple proximity inputs, as shown in FIG. 6. Detailed information on the selected multiple 3D individual objects OBJ1 and OBJ2 may be simultaneously read from the memory 160 of the mobile terminal 100 and displayed in the first display area on which the 3D map image is displayed or the second display area physically or logically separated from the first display area. The touch inputs or proximity inputs applied to the selected multiple 3D individual objects OBJ1 and OBJ2 may be cancelled, the displayed detailed information may disappear and the original 3D map image may be displayed in operations S284 and S285.

In another embodiment, the 3D individual object OBJ may be selected according to input of the 3D individual object control signal, such as a key input, a jog wheel input, a trackball input and/or a joystick input. A specific number or a pointer, such as an arrow, may designate the 3D individual object OBJ in the first display area. The user can press a key corresponding to the number of the 3D individual object OBJ to select the 3D individual object OBJ and view detailed information on the selected 3D individual object OBJ. The detailed information on the selected 3D individual object may be displayed while the 3D individual object control signal is input, and the displayed detailed information may disappear and the original 3D map image may be displayed when the 3D individual object control signal is not input.

Figure 30:
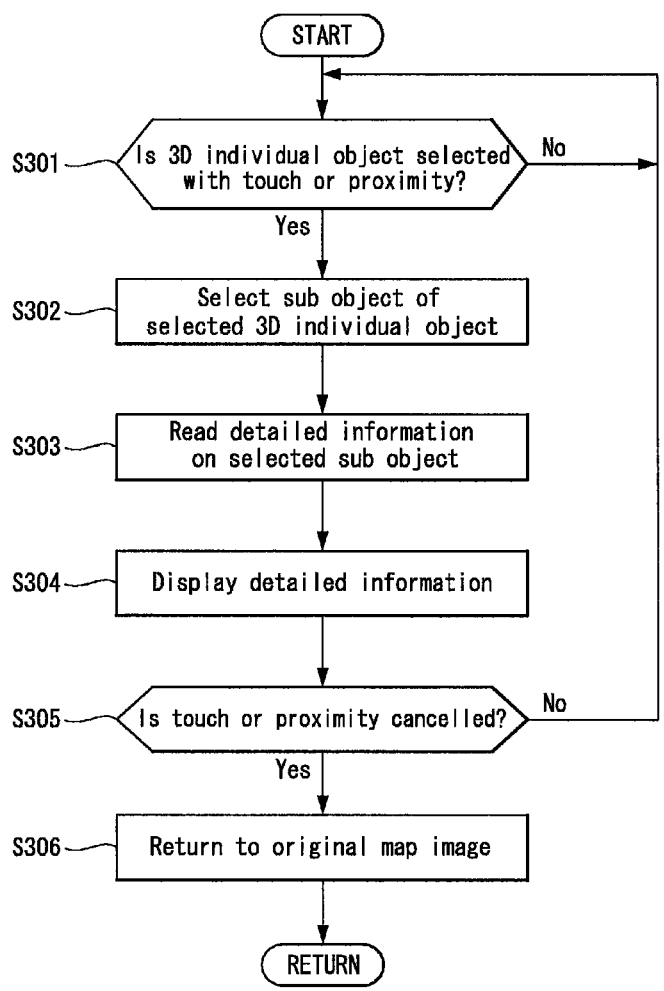
FIG. 30 is a flowchart illustrating a method of controlling a 3D individual object according to a fifteenth example embodiment of the present invention.

FIG. 30 is a flowchart illustrating a method of controlling a 3D individual object according to a fifteenth example embodiment of the present invention. The method according to the fifteenth example embodiment may be explained with reference to FIGS. 29A and 29B. This method may be performed under the control of the controller 180. Other embodiments, operations and orders of operation may also be within the scope of the present invention.

A 3D map image may be displayed on the touch screen of the mobile terminal 100, as shown in FIG. 29A. When the 3D map image is touched or proximity-touched, a 3D individual object OBJ corresponding to the touched point in the 3D map image may be automatically selected. When a key input corresponding to a sub object in the selected 3D individual object OBJ is generated while the touch or proximity touch applied to the 3D individual object OBJ is maintained, detailed information on the sub object in the selected 3D individual object OBJ may be automatically displayed in operations S301, S302, S303 and S304. The controller 180 of the mobile terminal 100 may read the detailed information on the portion in the selected 3D individual object OBJ from the memory 160 and display the detailed information in the first or second display areas. For example, the selected 3D individual object OBJ corresponds to a building, the sub object in the selected 3D individual object OBJ corresponds to a specific floor of the building, and the displayed detailed information on the sub object includes a firm name and type of a business enterprise, bookmark information and transportation information associated with the floor of the building (i.e., the sub object included in the selected 3D individual object OBJ). For example, the user can touch or proximity-touch the building with his/her finger or a stylus pen to select the building and press a predetermined key corresponding to the specific floor of the building to view detailed information on the floor.

The selected 3D individual object OBJ may include a specific object, such as a building or a natural object, or a specific zone that includes the specific object.

Different effective sounds or haptic patterns may be set for 3D individual objects on the 3D map image based on attributes of the 3D individual objects (e.g. a road, a building, a natural object, etc.). Accordingly, the user can recognize the selected 3D individual object through the effective sound or haptic pattern set for the 3D individual object.

The first display area may display an outline between the selected 3D individual object OBJ and an unselected image surrounding the selected 3D individual object or the first display area may reduce a luminance of the unselected image and increase a luminance of the selected 3D individual object OBJ in order to easily recognize the 3D individual object OBJ when the 3D individual object OBJ is selected under control of the controller 180. When the 3D individual object OBJ is selected, detailed information on the selected 3D individual object OBJ may be displayed in the second display area RIW.

When the touch or proximity-touch applied to the selected 3D individual object OBJ is cancelled, the detailed information on the selected 3D individual object may disappear from the touch screen and the original 3D map image may be displayed on the touch screen in operations S305 and S306.

The user can select, in operation S301, multiple 3D individual objects OBJ1 and OBJ2 and sub objects included in the 3D individual objects OBJ1 and OBJ2 according to a combination of multiple touch inputs or multiple proximity inputs and key inputs, as shown in FIG. 6.

Figure 31:
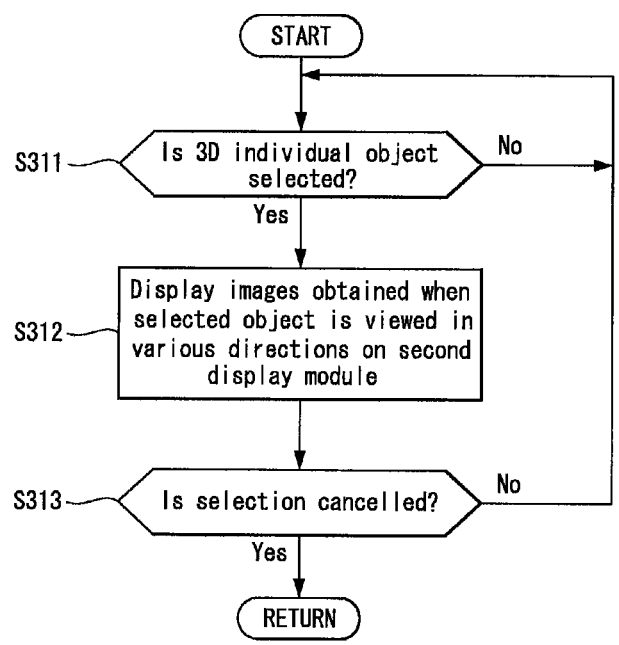
FIG. 31 is a flowchart illustrating a method of controlling a 3D individual object according to a sixteenth example embodiment of the present invention.
Figure 32:
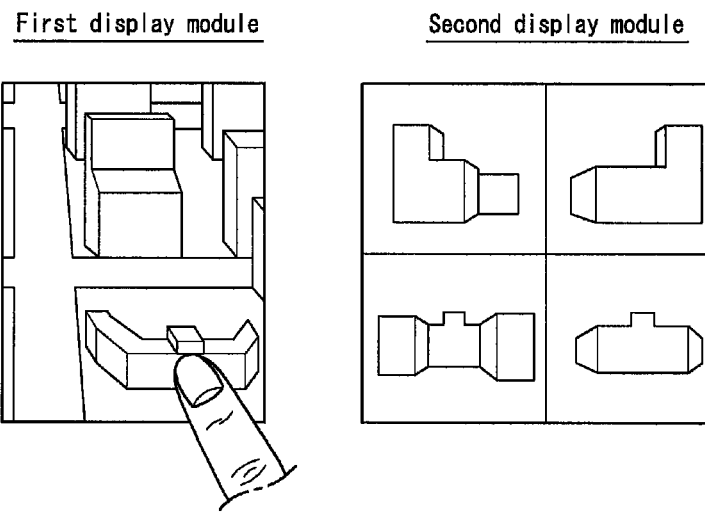
FIGS. 32 and 33 illustrate 3D map images according to the sixteenth example embodiments.
Figure 33:
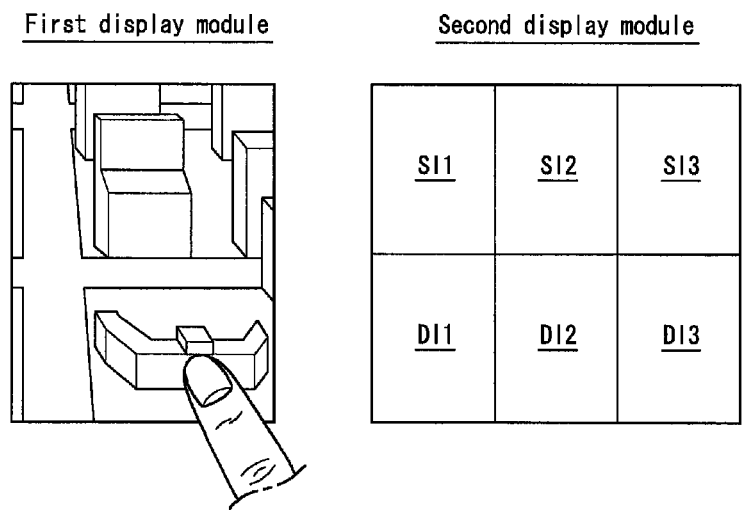

FIG. 31 is a flowchart illustrating a method of controlling a 3D individual object according to a sixteenth example embodiment of the present invention. FIGS. 32 and 33 illustrate 3D map images showing an example of the method according to the sixteenth example embodiment. This method may be performed under control of the controller 180. Other embodiments, operations and orders of operation may also be within the scope of the present invention.

A 3D map image may be displayed in the first display area of the mobile terminal 100 and detailed information on a 3D individual object selected by a user may be displayed in the second display area of the mobile terminal 100, as shown in FIGS. 32 and 33. The first and second display areas may be physically or logically separated from each other. Both the first and second display areas may have a touch screen and/or only the first display area may have a touch screen.

When the user selects a 3D individual object through a touch input, a proximity input or a 3D individual object control signal input in operation S311, detailed information on the selected 3D individual object may be displayed in the second display area. The detailed information on the selected 3D individual object may be stored in the mobile terminal 100 and may be automatically read by the controller 180 when selected. The detailed information on the selected 3D individual object, displayed in the second display area, may include 2D/3D graphic images displayed when the user views the selected 3D individual object at various orientations (angles) or pictures and videos captured in various directions in operation S312. For example, 2D/3D graphic images obtained by capturing the 3D individual object in four directions may be displayed in the second display area, as shown in FIG. 32. Otherwise, various pictures S11, S12 and S13 and videos D11, D12 and D13 with respect to the selected 3D individual object may be displayed as thumbnail images in the second display area, as shown in FIG. 33. The graphic images of the 3D individual object may be displayed in the second display area simultaneously or sequentially at a predetermined time interval.

The selected 3D individual object OBJ may include a specific object, such as a building or a natural object, or a specific zone that includes the specific object.

Different effective sounds or haptic patterns may be set for 3D individual objects on the 3D map image based on attributes of the 3D individual objects (e.g. a road, a building, a natural object, etc.). Accordingly, the user can recognize the selected 3D individual object through the effective sound or haptic pattern set for the 3D individual object.

The first display area may display an outline between the selected 3D individual object OBJ and an unselected image surrounding the selected 3D individual object or the first display area may reduce a luminance of the unselected image and increase a luminance of the selected 3D individual object OBJ in order to easily recognize the 3D individual object OBJ when the 3D individual object OBJ is selected under the control of the controller 180.

When the 3D individual object control signal input applied to the selected 3D individual object OBJ is cancelled, detailed information on the selected 3D individual object may disappear from the second display area and the original 3D map image may be displayed in operation S313.

The user can select, in operation S311, multiple 3D individual objects OBJ1 and OBJ2 and sub objects included in the 3D individual objects OBJ1 and OBJ2 according to multiple touch inputs or multiple proximity inputs, as shown in FIG. 6. In this example, detailed information on the selected 3D individual objects OBJ1 and OBJ2 may be simultaneously displayed in the second display area.

In another embodiment, graphic images of the selected 3D individual object that show a temporal variation in the selected 3D individual object may be displayed in the second display area. For example, an image obtained by capturing the selected 3D individual object in the daytime and an image obtained by capturing the selected 3D individual object in the nighttime may be displayed in the second display area simultaneously or sequentially at a predetermined time interval. Further, images obtained by photographing the selected 3D individual object in spring, summer, fall and winter may be displayed in the second display area simultaneously or sequentially at a predetermined time interval.

Figure 34:
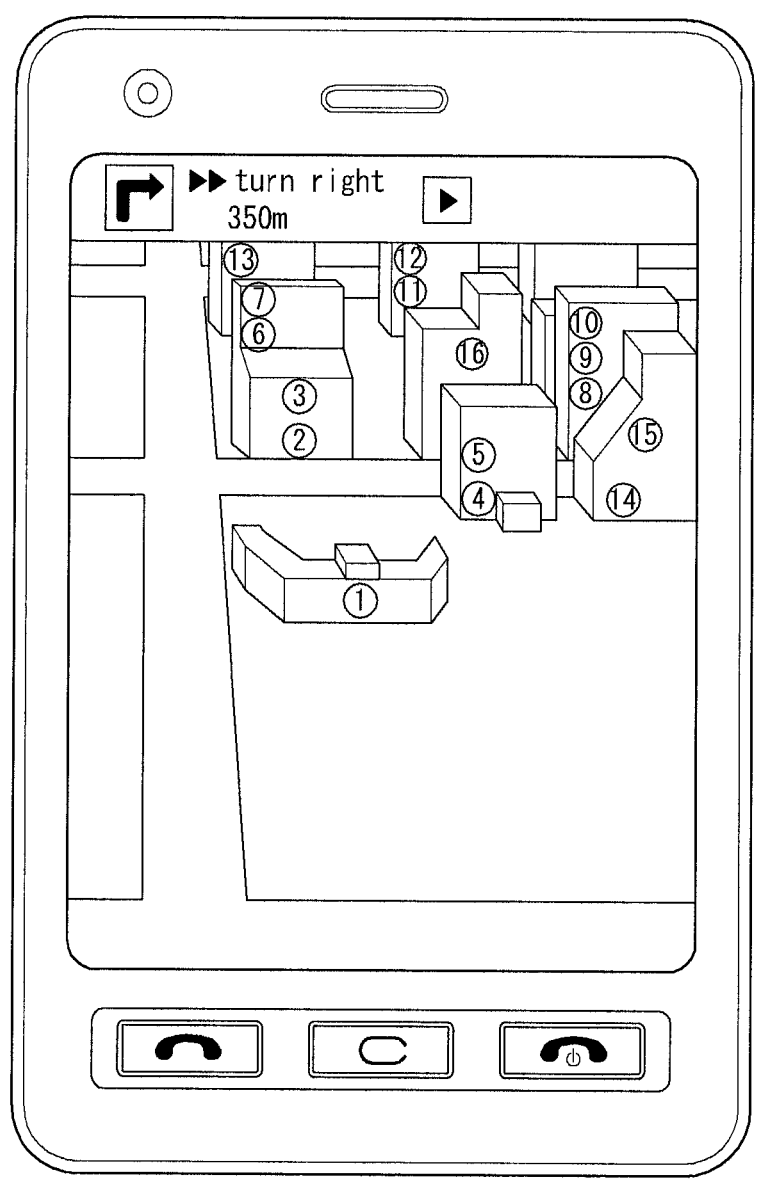
FIG. 34 is a flowchart illustrating a method of controlling a 3D individual object according to a seventeenth example embodiment of the present invention.

FIG. 34 is a flowchart illustrating a method of controlling a 3D individual object according to a seventeenth example embodiment of the present invention. This method may be performed under control of the controller 180. Other embodiments, operations and orders of operation may also be within the scope of the present invention.

A 3D map image with quick numbers respectively denoting 3D individual objects OBJ included in the 3D map image that are previously designated by a user, for example, "favorite" numbers, may be displayed on the mobile terminal 100, as shown in FIG. 34. Different effective sounds or haptic patterns may be set for the 3D individual objects OBJ on the 3D map image based on attributes of the 3D individual objects (e.g. road, building, natural object, etc.). Accordingly, the user can recognize a selected 3D individual object through the effective sound or haptic pattern set for the 3D individual object.

The user can select a 3D individual object through a key corresponding to the "favorite" number of the 3D individual object that is displayed on the touch screen of the mobile terminal 100. The selected 3D individual object may be controlled according to the above-described embodiments, that is, control methods of displaying detailed information on the selected 3D individual object, for example, graphic image information such as images of the selected 3D individual object, viewed at various angles and in various directions and orientations, zoom-in/zoom-out images, pictures and videos showing images according to season/time, tourism information, detailed information on floors of a building, bookmark information, transportation information, graphic image information on a 3D individual object at least partially hidden behind the selected 3D individual object.

The "favorite" numbers may be designated by the user and stored in the memory 160 or may be automatically designated by the controller 180 through a method of learning a number of times of selecting or retrieving a 3D individual object frequently selected by the user or sub-objects included in the 3D individual object. An outline may be displayed between the selected 3D individual object OBJ and an unselected image surrounding the selected 3D individual object or a luminance of the unselected image is reduced and a luminance of the selected 3D individual object OBJ is increased in order to easily recognize the 3D individual object OBJ when the 3D individual object OBJ is selected.

In another embodiment, when the 3D map image is displayed on the mobile terminal 100 without having the favorite numbers and the user selects a 3D individual object from 3D individual objects on the 3D map image by using various methods of inputting the 3D individual object control signal, a favorite number existing in the selected 3D individual object may be automatically displayed on the 3D map image.

Figure 35:
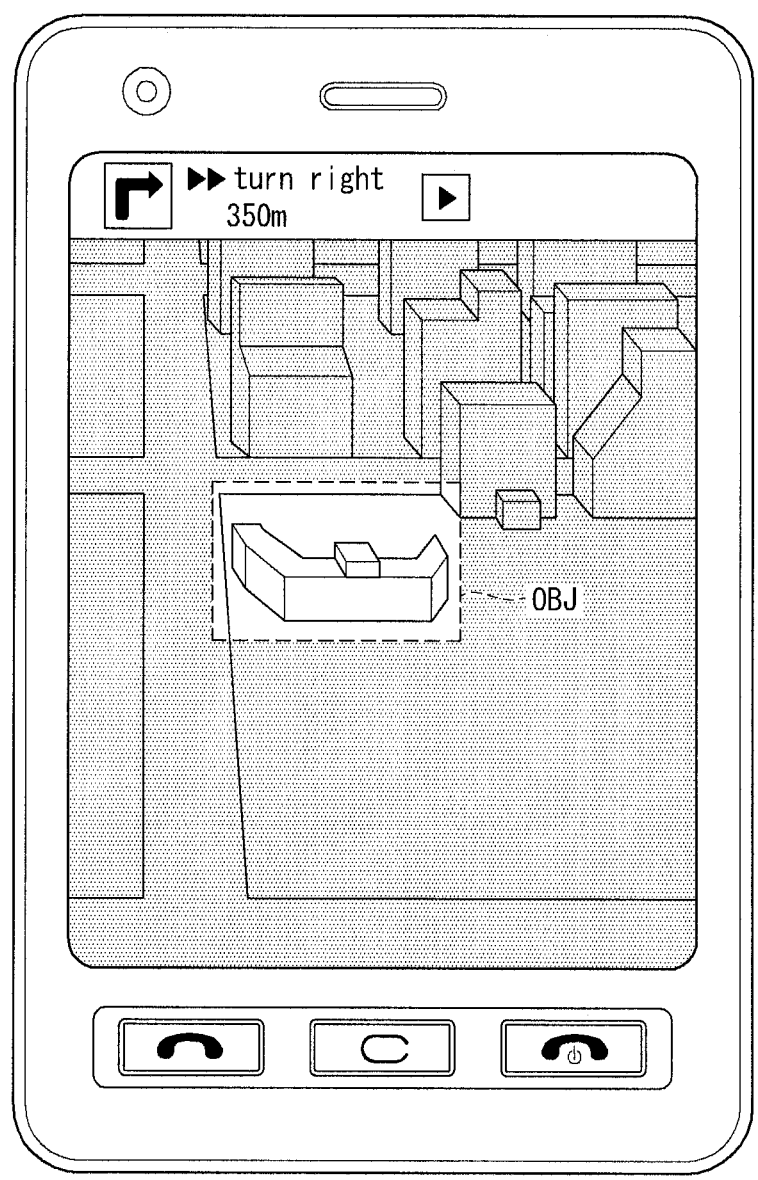
FIG. 35 is a flowchart illustrating a method of controlling a 3D individual object according to an eighteenth example embodiment of the present invention.

FIG. 35 is a flowchart illustrating a method of controlling a 3D individual object according to an eighteenth example embodiment of the present invention. This method may be performed under control of the controller 180. Other embodiments, operations and orders of operation may also be within the scope of the present invention.

A 3D map image may be displayed on the mobile terminal 100 and a 3D individual object OBJ to be independently controlled may be selected from 3D individual objects in the 3D map image through the above-described 3D individual object control signal input methods.

To easily recognize the selected 3D individual object OBJ, an outline between the selected 3D individual object OBJ and an unselected image surrounding the selected 3D individual object may be displayed or a luminance of the unselected image may be reduced and a luminance of the selected 3D individual object OBJ may be increased. Otherwise, outlining and luminance differentiation may be applied together in order to distinguish the selected 3D individual object from the unselected image.

In another embodiment, the background color tone of the selected 3D individual object OBJ may be made different from that of the unselected image surrounding the selected 3D individual object OBJ. Further, at least two of outlining, luminance differentiation and color tone differentiation may be applied together in order to distinguish the selected 3D individual object from the unselected image.

The selected 3D individual object may be controlled according to the above-described embodiments, that is, control methods of displaying detailed information on the selected 3D individual object, for example, graphic image information such as images of the selected 3D individual object, viewed at various angles and in various directions and orientations, zoom-in/zoom-out images, pictures and videos showing images according to season/time, tourism information, detailed information on floors of a building, bookmark information, transportation information, graphic image information on a 3D individual object hidden behind the selected 3D individual object.

A method of controlling a 3D individual object may be embodied as computer readable codes on a computer readable recording medium.

The method of controlling a 3D individual object may be executed through software. Components of embodiments may be code segments executing required operations. Programs or code segments may be stored in a processor readable medium and/or transmitted according to a computer data signal combined with a carrier through a transmission medium or a communication network.

The computer readable recording medium may be any data storage device that can store data that can be thereafter read by a computer system. Examples of the computer readable recording medium may include ROM, RAM, CD-ROM, DVD-ROM, DVD-RAM, magnetic tapes, floppy disks, hard disks, and optical data storage devices. The computer readable recording medium may also be distributed over network coupled computer systems so that the computer readable code is stored and executed in a distributed fashion.

A method may be provided of controlling a 3D individual object on a map. The method may include displaying a 3D map image including a plurality of 3D individual objects on a first display panel (or first display area or window), selecting at least one 3D individual object, and independently controlling the selected 3D individual object to read detailed information on the selected 3D individual object from a memory. The detailed information may be displayed on a second display panel (or second display area or window).

A mobile terminal may include a memory storing a 3D map image and detailed information on a plurality of 3D individual objects included in the 3D map image, a first display panel (or second display area or window) displaying the 3D map image including the plurality of 3D individual objects, an input and sensing unit receiving a user input for selecting a 3D individual object, and a controller controlling display of the 3D map image and independently controlling the 3D individual object selected according to the user input to read detailed information on the selected 3D individual object from the memory. A second display panel (or second display area or window) may display the detailed information on the selected 3D individual object.

A mobile terminal may include a cellular phone, a smart phone, a notebook computer, a digital broadcasting terminal, a personal digital assistant (PDA), a portable multimedia player (PMP), a navigation terminal and so on.

A 3D map image may be a three-dimensional map image displayed on a display screen of a mobile terminal. The 3D map image may include a plurality of 3D individual objects that are respectively displayed as 3D graphic images and may be independently controllable. A 3D individual object selected by a user may show detailed information on the 3D individual object. A mobile terminal may convert 3D map data from a memory into a 3D map image by using a 3D image processing algorithm, change a resolution of the 3D map image such that the 3D map image is suited to a display screen and display the 3D map image on the display screen. The 3D map data may be transmitted to the mobile terminal from a computer or a database wired/wirelessly connected to the mobile terminal and stored in a memory of the mobile terminal. The 3D map data may also be transmitted from a server and/or a terminal of a mobile communication service provider through a mobile communication network and stored in the memory of the mobile terminal.

3D individual objects may include individual artificial structures such as buildings, bridges, roads, artificial parks and so on and/or natural objects such as mountains, rivers, natural parks and so on. These objects may be individually identified on a 3D map displayed on a mobile terminal. A 3D individual object may include a plurality of zones each of which may include at least one object in a 3D map and may be divided into regions having a specific size. The motion of a 3D individual object or detailed information on the 3D individual object may be separated from other individual objects and may be independently controlled. 3D individual objects displayed on a 3D image map may be overlapped, an individual object selected by a user may be erased and an individual object that was covered with the erased individual object may be seen. An attribute of a 3D individual object (i.e., a road, a building, a bridge, a mountain, a river and so on) may be given to the 3D individual object and attribute information of the 3D individual object may be stored in a memory of a mobile terminal. To intuitively identify a 3D individual object, an effective sound or a haptic pattern may be provided to the 3D individual object based on the attribute of the 3D individual object. The attribute of the 3D individual object and the effective sound or the haptic pattern provided to the 3D individual object based on the attribute may be stored in the memory of the mobile terminal and may be transmitted to the mobile terminal from an information device such as a computer through a mobile communication network, the Internet and/or a short-range communication channel.

Detailed information on a 3D individual object may include detailed information on the 3D individual object that may not be detected from only an image of the 3D individual object displayed on a 3D map image. Detailed information on a 3D individual object selected on the 3D map image may include graphic image information such as still images and/or moving images including an image at an angle in a direction and/or orientation different from those of unselected other neighboring 3D individual objects, zoom-in/zoom-out images, images varying with season and time and so on. Further, the detailed information on the selected 3D individual object may include tourism related text information associated with the 3D individual object, detailed individual object related text information (e.g., information on each floor) included in the selected 3D individual object, quick selection related text information (e.g., bookmark related information), transportation related text information and so on. When a plurality of 3D individual objects are provided on a 3D individual object by a user, information on the 3D individual objects may include detailed information on an individual object hidden by another individual object (i.e., graphic image information on the hidden individual object) and other information. 3D individual object information may be stored in a memory of a mobile terminal and may be transmitted from an information device such as a computer to the mobile terminal via a mobile communication network, the Internet and/or a short-range communication channel.

A 3D individual object control signal may be generated by a controller of the mobile terminal and may independently control motion of each 3D individual object or detailed information on each 3D individual object. The 3D individual object control signal may be generated based on a user's selection instruction input through user interfaces provided by the mobile terminal, for example, a key, a wheel, a ball, a stick, a touch sensor, a proximity sensor, a gyro sensor, a terrestrial magnetic sensor, etc.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a mobile terminal having a touchscreen, the method comprising:
    displaying a three-dimensional (3D) map image including a plurality of 3D individual objects on a first display area of the touchscreen;
    receiving a touch input for selecting at least one 3D individual object from the displayed 3D map image, the at least one 3D individual object being displayed on the first display area;
    displaying the 3D object in a second display area of the touchscreen; and
    after maintaining the touch input to the at least one 3D individual object displayed on the first display area of the touchscreen for a predetermined amount of time, rotating the 3D object displayed in the second display area of the touchscreen while simultaneously displaying the 3D map image on the first display area,
    wherein the displaying of the selected 3D individual object includes displaying a detailed information regarding the selected 3D individual object,
    wherein the detailed information of the selected 3D individual object includes image information of another 3D individual object at least partially behind the selected 3D individual object, the selected 3D individual object being a different object than the another 3D individual object at least partially behind the selected 3D individual object,
    wherein the selected 3D individual object and the another 3D individual object at least partially behind the selected 3D individual object are displayed alternatively such that the selected 3D individual object disappears when the another 3D individual object behind the selected 3D individual object is displayed.

2. The method of claim 1, further comprising displaying information regarding the 3D individual object in the second display area.

3. The method of claim 1, further comprising displaying a different view of the 3D map image in the first display area.

4. The method of claim 1, further comprising:
    displaying, in the second display area, direction pointers with the 3D individual object; and
    displaying, in the second display area, either a video in which the 3D individual object rotates or a picture of the 3D individual object that is viewed at an angle different from the angle of the 3D individual object displayed on the 3D map image, when one of the direction pointers is selected from the displayed direction pointers based on a user input.

5. A mobile terminal comprising:
    a memory to store a three-dimensional (3D) map image and detailed information on a plurality of 3D individual objects included in the 3D map image;
    a touchscreen display having a first display area and a second display area, the display to display the 3D map image including the plurality of 3D individual objects;
    an input unit to receive a user input for selecting one of the 3D individual objects; and
    a controller to control display of the 3D map image and to control the 3D individual object based on the user input, and wherein the touchscreen display to display the selected 3D object in the second display area, the controller to determine when a touch input to the selected 3D individual object displayed in the second display area of the touchscreen display is maintained for a predetermined amount of time, and after the controller determines the touch input is maintained for the predetermined amount of time, the controller to rotate the selected 3D individual object displayed in the second display area of the touchscreen display while simultaneously displaying the 3D map image, wherein when the controller is displaying the selected 3D individual object, the controller further displaying a detailed information regarding the selected 3D individual object, wherein the detailed information of the selected 3D individual object includes image information of another 3D individual object at least partially behind the selected 3D individual object, the selected 3D individual object being a different object than the another 3D individual object at least partially behind the selected 3D individual object, wherein the selected 3D individual object and the another 3D individual object at least partially behind the selected 3D individual object are displayed alternatively such that the selected 3D individual object disappears from the touchscreen display when the another 3D individual object behind the selected 3D individual object is displayed.

6. The mobile terminal of claim 5, wherein the controller to control the display to display information regarding the selected 3D individual object in the second display area.

7. The mobile terminal of claim 5, wherein the display to further display, in the first display area, additional information that was previously at least partially hidden behind the selected 3D individual object.

8. The mobile terminal of claim 5, wherein the controller to control the display to display a different view of the 3D map image in the first display area.

9. The mobile terminal of claim 5, wherein the controller displays, in the second display area, either a video in which the selected 3D individual object rotates or a picture of the selected 3D individual object that is viewed at an angle different from an angle of the selected 3D individual object displayed on the 3D map image.

10. The mobile terminal of claim 5, wherein the controller displays, in the second display area, direction pointers with the selected 3D individual object in the second display area and displays, in the second display area, either a video in which the selected 3D individual object rotates or a picture of the selected 3D individual object that is viewed at an angle different from an angle of the selected 3D individual object displayed on the 3D map image, when one of the displayed direction pointers is selected according to the user input.

11. The mobile terminal of claim 5, wherein the controller displays, in the second display area, either a video in which the selected 3D individual object rotates in a dragging direction of at least one of a touch drag and a proximity drag input through the input unit or a picture of the selected 3D individual object that is viewed at an angle different from the angle of the selected 3D individual object displayed on the 3D map image.

* * * * *